US011102773B2

United States Patent
Karaki et al.

(10) Patent No.: US 11,102,773 B2
(45) Date of Patent: Aug. 24, 2021

(54) SETTING HARQ TIMING FOR PDSCH WITH PENDING PDSCH-TO-HARQ-TIMING-INDICATOR

(71) Applicant: Telefonaktiebolaget LM Ericsson (publ), Stockholm (SE)

(72) Inventors: Reem Karaki, Aachen (DE); Sorour Falahati, Stockholm (SE); Yuhang Liu, Lund (SE); Johan Rune, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/002,866

(22) Filed: Aug. 26, 2020

(65) Prior Publication Data

US 2020/0389878 A1     Dec. 10, 2020

Related U.S. Application Data

(63) Continuation of application No. PCT/IB2019/060371, filed on Dec. 2, 2019.

(Continued)

(51) Int. Cl.
*H04W 72/04* (2009.01)
*H04L 5/14* (2006.01)
*H04L 1/18* (2006.01)

(52) U.S. Cl.
CPC ......... *H04W 72/042* (2013.01); *H04L 1/1812* (2013.01); *H04L 1/1861* (2013.01); *H04L 5/14* (2013.01)

(58) Field of Classification Search
CPC ... H04B 1/56; H04B 7/2656; H04W 72/0446; H04W 88/08; H04W 76/02

(Continued)

(56) References Cited

U.S. PATENT DOCUMENTS

2020/0145167 A1*  5/2020  Jung .................. H04L 5/0007
2020/0267597 A1*  8/2020  Huang ................ H04L 5/0094

(Continued)

OTHER PUBLICATIONS

3GPP TSG RAN WG1 Meeting #96 bis, R1-1905649, Xi'an, China, Apr. 8-12, 2019, Agenda item: 7.2.2.2.3, Source: Huawei, Title: Feature lead summary of HARQ enhancements for NR-U. (Year: 2019).*

(Continued)

*Primary Examiner* — Peter G Solinsky
*Assistant Examiner* — Sanjay K Dewan
(74) *Attorney, Agent, or Firm* — Withrow & Terranova, PLLC

(57) ABSTRACT

Methods and systems for setting Hybrid Automatic Repeat Request (HARQ) timing for Physical Downlink Shared Channel (PDSCH) with a pending PDSCH-to-HARQ-timing-indicator (PHTI) are provided. In one aspect, a method performed by a wireless device comprises: receiving a first Downlink Control Information (DCI) associated with a first Downlink (DL) data transmission, the first DCI comprising a non-numerical PHTI; receiving the first DL data transmission; determining a HARQ feedback for the first DL data transmission; receiving a second DCI associated with a second DL data transmission, the second DCI comprising a numerical PHTI indicating a location for HARQ feedback associated with the second DL data transmission; setting the location of HARQ feedback associated with the first DL data transmission to be the same as the location of HARQ feedback associated with the second DL data transmission; and transmitting the HARQ feedback associated with the first DL data transmission at the set location.

29 Claims, 16 Drawing Sheets

Related U.S. Application Data

(60) Provisional application No. 62/836,228, filed on Apr. 19, 2019.

(58) Field of Classification Search
USPC .......................................................... 370/280
See application file for complete search history.

(56) References Cited

U.S. PATENT DOCUMENTS

2020/0275430 A1* 8/2020 Salem .................. H04L 5/0055
2020/0337077 A1* 10/2020 Yoshimura ............ H04W 72/04

OTHER PUBLICATIONS

Author Unknown, "Technical Specification Group Radio Access Network; NR; Multiplexing and channel coding (Release 16)," Technical Specification 38.212, Version 16.1.0, 3GPP Organizational Partners, Mar. 2020, 141 pages.

Author Unknown, "Technical Specification Group Radio Access Network; NR; Physical layer procedures for control (Release 16)," Technical Specification 38.213, Version 16.1.0, 3GPP Organizational Partners, Mar. 2020, 156 pages.

Author Unknown, "Technical Specification Group Radio Access Network; NR; Radio Resource Control (RRC) protocol specification (Release 16)," Technical Specification 38.331, Version 16.0.0, 3GPP Organizational Partners, Mar. 2020, 832 pages.

Huawei, "R1-1905649: Feature lead summary of HARQ enhancements for NR-U," Third Generation Partnership Project (3GPP), TSG RAN WG1 Meeting #96bis, Apr. 8-12, 2019, 29 pages, Xi'an, China.

MCC Support, "R1-1905921: Final Report of 3GPP TSG RAN WG1 #96b v1.0.0 (Xi'an, China, Apr. 8-12, 2019)," Third Generation Partnership Project (3GPP), TSG RAN WG1 Meeting #97bis, May 13-17, 2019, 159 pages, Reno, USA.

MCC Support, "R1-1911429: Final Report of 3GPP TSG RAN WG1 #98b v2.0.0 (Prague, Czech Rep, Aug. 26-30, 2019)," Third Generation Partnership Project (3GPP), TSG RAN WG1 Meeting #98bis, Oct. 14-18, 2019, 180 pages, Chongqing, China.

International Search Report and Written Opinion for International Patent Application No. PCT/IB2019/060371, dated Apr. 9, 2020, 18 pages.

\* cited by examiner

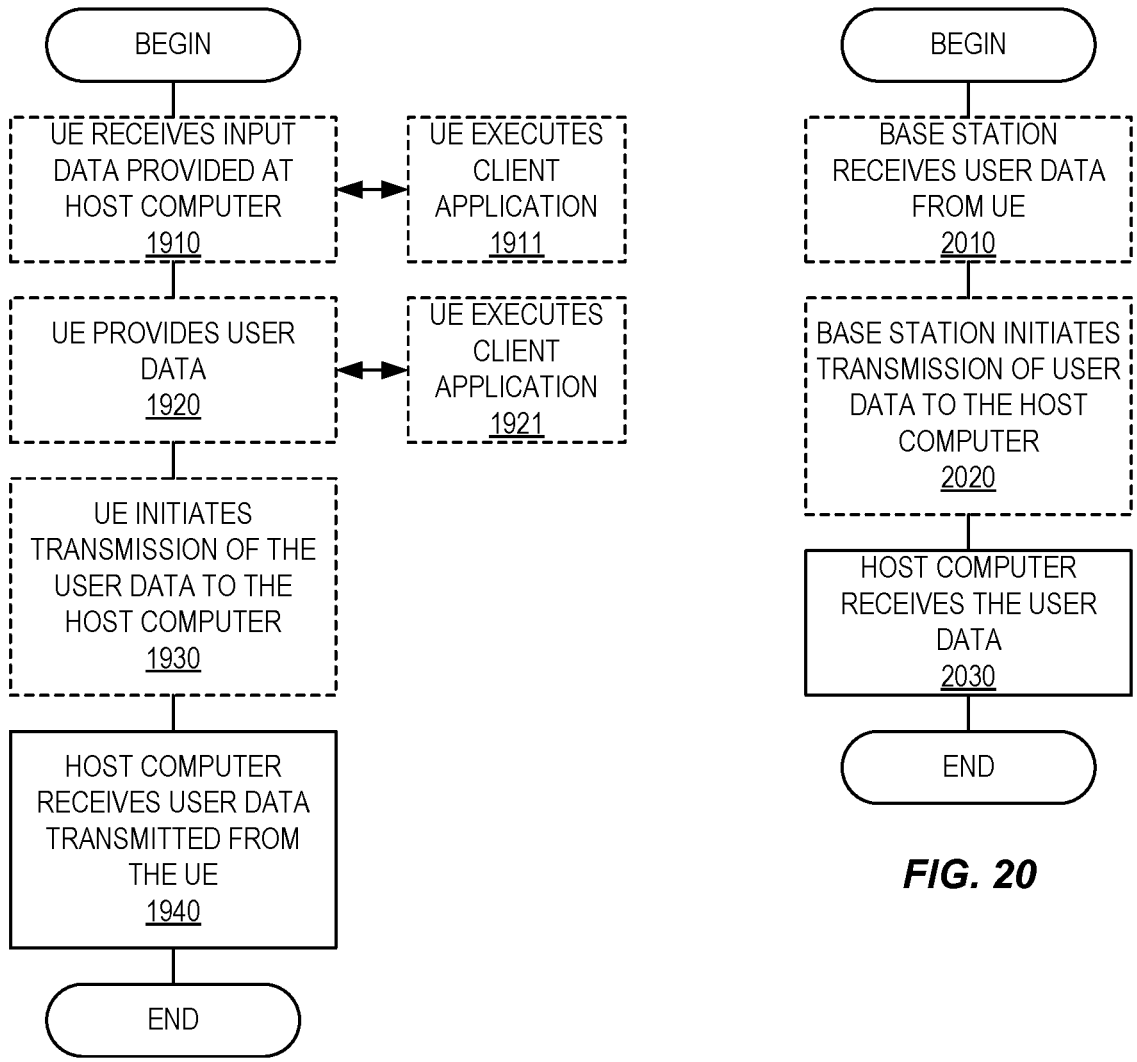

SETTING HARQ TIMING FOR PDSCH WITH PENDING PDSCH-TO-HARQ-TIMING-INDICATOR

RELATED APPLICATIONS

This application is a continuation of international patent application number PCT/IB2019/060371, filed Dec. 2, 2019, which claims the benefit of provisional patent application Ser. No. 62/836,228, filed Apr. 19, 2019, the disclosures of which are hereby incorporated herein by reference in their entireties.

TECHNICAL FIELD

This application relates to Physical Downlink Shared Channel (PDSCH) to Hybrid Automatic Repeat Request (HARQ) timing and in particular to setting HARQ timing for PDSCH by means of a pending PDSCH-to-HARQ-timing-indicator.

BACKGROUND

New Radio (NR) provides the flexibility in Hybrid Automatic Repeat Request (HARQ) feedback timing to account for dynamic Time Division Duplexing (TDD) and also possibly combine several HARQ feedbacks for both lower overhead and higher reliability.

FIG. 1 illustrates Hybrid Automatic Repeat Request (HARQ) feedback according to a conventional NR system. The timing (referred to as K1) between a Downlink (DL) data transmission (e.g., 100A, 100B, and so on) on a Physical Downlink Shared Channel (PDSCH) and its corresponding HARQ Acknowledgement (ACK) or Negative Acknowledgement (NACK) (e.g., 102A, 102B, and so on) on a Physical Uplink Control Channel (PUCCH) is determined based on a 3-bit field in the Downlink Control Information (DCI) within a Physical Downlink Control Channel (PDCCH) for the respective DL data transmission. Radio Resource Control (RRC) messages configure the User Equipment (UE) with a set of 8 values to be indexed by the 3-bit field in the DCI to produce a value for K1 (possible value range is {0, 1, ..., 15}) to be used by the UE for the timing of the corresponding HARQ. As illustrated in FIG. 1, HARQ 102A occurs within the same slot (half subframe) as its corresponding DL data transmission 100A, and HARQ 102B occurs in the next slot after the slot that contains its corresponding DL data transmission 100B.

NR provides the flexibility to include aggregate feedback corresponding to multiple HARQ processes in one PUCCH/Uplink Control Information (UCI) transmission by means of semi-static codebooks and/or dynamic codebooks. As illustrated in FIG. 1, the HARQ for DL data transmissions 100C and 100D occur in a combined HARQ 102C.

Semi-Static HARQ Codebook

For semi-static HARQ codebooks, the codebook size in time (DL association set) is determined based on the configured set of HARQ-ACK timings K1, PDCCH monitoring occasions, and semi-static configured TDD patterns. For each slot, the UE needs to report a HARQ feedback bitmap of fixed size according to its Carrier Aggregation (CA) and Transport Block (TB)/Code Block Group (CBG) configuration. In this example, the bitmap size is 7 bits. For TBs/CBGs not received, the corresponding bit in the HARQ feedback bitmap is set to indicate a NACK.

Dynamic HARQ Codebook

Dynamic HARQ codebooks provide the possibility to dynamically determine the set of HARQ process for which the HARQ feedback should be reported. The DCI includes:
- a Downlink Assignment Indicator (DAI), which indicates the number of HARQ processes that should reported; and
- a PDSCH to HARQ-ACK timing ($\Delta T$), which specifies the time resource in which the eNB is expecting the feedback, e.g., as a time offset.

DAI Computation for Dynamic HARQ Codebook

The UE refers to the DAI value to calculate the dynamic HARQ codebook size. For every PDSCH transmission, the DAI value in the DCI is incremented. The DAI in the DL scheduling DCI should be stepped by one as compared to the immediate preceding DL scheduling DCI, if not, it is an indication that PDSCH transmission(s) has been missed. The difference between the two received DAI values at the UE in current and earlier DCI indicates how many PDSCH transmissions were missed.

FIG. 2 shows one example of combined HARQ feedback according to a conventional NR system. In FIG. 2, each slot contains a PDCCH with DCI values that include a DAI value and a $\Delta T$ value, followed by a PDSCH that contains a DL data transmission. In the example illustrated in FIG. 2, the values for DAI and $\Delta T$ are shown below the respective PDCCH block, arbitrarily numbered from one to seven. Moving from left to right, PDCCH 1 has a DAI value of 1, indicating to the UE that a HARQ will be needed for the PDSCH that immediately follows the first PDCCH, PDSCH 1. The $\Delta T$ value equals 6, indicating that the UE is expected to provide HARQ feedback 6 slots later. PDCCH 2 has a DAI value of 2, indicating to the UE that a HARQ will be needed for two PDSCHs, i.e., PDSCH 1 and PDSCH2. The $\Delta T$ value equals 5, indicating to the UE that it should provide HARQ feedback 5 slots later. PDCCH 3 has a DAI value of 3, indicating to the UE that a HARQ will be needed for each of three PDSCHs, i.e., PDSCH 1, PDSCH 2, and PDSCH 3.

This sequence continues, with the $\Delta T$ decreasing as the time for the UE to provide HARQ feedback to the NR base station (gNB) gets closer, and the DAI increasing as the number of HARQ processes that should reported increases. However, the DAI value in NR release 15 (rel-15) is only two bits (representing four possible values 0, 1, 2, 3); after reaching the highest DAI value (i.e., 3), the DAI value rolls over and starts again from the smallest value. This is shown in FIG. 2, where PDCCH 4 includes a DAI with a value of 0. PDSCH 7 is too close to the PDCCH to be included in the combined HARQ feedback, so PDCCH will include HARQ feedback for PDSCH 1 through PDSCH 6.

FIG. 3 shows another example of combined HARQ feedback according to a conventional NR system. In the example illustrated in FIG. 3, PUCCH 1 includes the HARQ feedback for PDSCH 1 and PDSCH 2. PDSCH 3 is too close to PUCCH 1, so PUCCH 2 includes the HARQ feedback for PDSCH 3, PDSCH 4, and PDSCH 5. In FIG. 3, PDSCH 6 is too close to PUCCH 2, so HARQ feedback for PDSCH 6 will need to be reported in a later PUCCH not shown in FIG. 3.

Problems with Conventional Systems

FIG. 4 illustrates one problem suffered by a conventional NR system. NR supports small processing delays, but not as small as to allow providing HARQ feedback within the same slot as the corresponding DL data transmission. For instance, with a Subcarrier Spacing (SPS) of 15 kilohertz (kHz), the Layer 1 (L1) processing delay from the end of the PDSCH until the beginning of the PUCCH is a minimum of 8 Orthogonal Frequency Division Multiplexing (OFDM) symbols assuming a capability 1 for a UE. Therefore, there will be an eight OFDM symbol gap between the PDSCH reception and the corresponding feedback via the PUCCH. For SCS of 30 kHz, HARQ feedback for PDSCH in slot n cannot be included in the PUCCH in slot n, and for SCS of 60 kHz, feedback the PDSCH in both slot n and n−1 cannot be included. As a result, HARQ feedback for those PDSCHs will have to occur in a later PUCCH.

However, that later time might fall outside the gNB's Channel Occupancy Time (COT). In that case, the UE may have to sense the channel according to a category 4 Listen Before Talk (LBT) before sending the feedback, which increases the chances that the UE will fail to provide the feedback at the indicated timing.

For this reason, the Third Generation Partnership Project (3GPP) NR in the unlicensed spectrum (NR-U) working group decided to support the possibility to postpone the HARQ feedback in order to give the UE a chance to send the feedback at a later time, possibly within another gNB initiated COT where the UE can send the feedback with fast LBT or even without LBT, depending on the situation:

Agreement:
  A non-numerical value is added to the possible range of PDSCH-to-HARQ-timing-indicator values defined in Rel-15, and is used to indicate to the UE that the HARQ-ACK feedback for the corresponding PDSCH is postponed until the timing and resource for the HARQ-ACK feedback is provided by the gNB.

However, the UE behavior when receiving this indication is not clear, and the mechanism to trigger the pending feedback is not specified.

Certain aspects of the present disclosure and their embodiments may provide solutions to these or other challenges. The present disclosure specifies UE behavior when receiving a non-numerical K1 value that indicates that the HARQ feedback is postponed.

There are, proposed herein, various embodiments which address one or more of the issues disclosed herein. Certain embodiments may provide one or more of the following technical advantage(s). The UE behavior when receiving non-numerical K1 value is undefined and the present disclosure provides different alternatives on how to resolve the issue.

SUMMARY

Methods and systems for setting Hybrid Automatic Repeat Request (HARQ) timing for Physical Downlink Shared Channel (PDSCH) with a pending PDSCH-to-HARQ-timing-indicator are provided.

According to one aspect of the present disclosure, a method, performed by a wireless device, for setting Hybrid Automatic Repeat Request (HARQ) timing for Physical Downlink Shared Channel (PDSCH) with a pending PDSCH-to-HARQ-timing-indicator comprises: receiving a first Downlink Control Information (DCI) associated with a first Downlink (DL) data transmission, the first DCI comprising a non-numerical PDSCH-to-HARQ-timing-indicator; receiving the first DL data transmission; determining a HARQ feedback for the first DL data transmission; receiving a second DCI associated with a second DL data transmission, the second DCI comprising a numerical PDSCH-to-HARQ-timing-indicator indicating a location in time for HARQ feedback associated with the second DL data transmission; setting a location in time of HARQ feedback associated with the first DL data transmission to be the same as the location in time of HARQ feedback associated with the second DL data transmission; and transmitting the HARQ feedback associated with the first DL data transmission at the set location in time.

In some embodiments, receiving the second DCI comprises receiving information indicating a number of how many HARQ processes should be reported, the number including all pending PDSCHs and all PDSCHs having a DCI comprising a non-numerical PDSCH-to-HARQ-timing-indicator since a last PDSCH have a DCI comprising a numerical PDSCH-to-HARQ-timing-indicator.

In some embodiments, receiving the information indicating a number of how many HARQ processes should be reported comprises receiving a Downlink Assignment Indicator (DAI).

In some embodiments, setting the location in time of HARQ feedback associated with the first DL data transmission to be the same as the location in time of HARQ feedback associated with the second DL data transmission, and transmitting the HARQ feedback associated with the first DL data transmission at the set location in time are performed only upon determining that the second DL data transmission is of the same PDSCH group as the first DL data transmission.

In some embodiments, receiving the second DCI associated with the second DL data transmission comprises receiving a User Equipment (UE)-specific DCI transmitted on a Physical Downlink Control Channel (PDCCH) the UE-specific DCI comprising the PDSCH-to-HARQ-timing-indicator.

In some embodiments, the UE-specific DCI further comprises a HARQ process Identifier (ID).

In some embodiments, the UE-specific DCI further comprises a New Data Indicator (NDI) value corresponding to the HARQ process ID.

In some embodiments, the UE-specific DCI further comprises a PDSCH group ID and a corresponding Downlink Assignment Indicator (DAI).

In some embodiments, the UE-specific DCI further comprises a trigger bit indicating that the PDSCH-to-HARQ-timing-indicator is applicable to all PDSCHs with a pending or non-numerical PDSCH-to-HARQ-timing-indicator.

In some embodiments, the trigger bit comprises part of a DCI that is scheduling a PDSCH.

In some embodiments, the trigger bit comprises part of a DCI that is not scheduling a PDSCH.

According to one aspect of the present disclosure, a method, performed by a wireless device, for setting Hybrid Automatic Repeat Request (HARQ) timing for Physical Downlink Shared Channel (PDSCH) with a pending PDSCH-to-HARQ-timing-indicator comprises: receiving a first Downlink Control Information (DCI) associated with a first Downlink (DL) data transmission of a first PDSCH group, the first DCI comprising a numerical PDSCH-to-HARQ-timing-indicator; determining that a location in time for HARQ feedback that is associated with the first DL data transmission, indicated by the numerical PDSCH-to-HARQ-timing-indicator, is too close to the first DL data transmission; and in response to that determination, not transmitting the HARQ feedback that is associated with the first DL data transmission at the indicated HARQ transmission time.

In some embodiments, the method further comprises providing an indication, on the Physical Uplink Control Channel (PUCCH) at the indicated HARQ transmission time, which informs the New Radio base station, gNB, that the HARQ feedback was postponed.

In some embodiments, the method further comprises receiving a second DCI associated with a second DL data transmission, the second DCI comprising a numerical PDSCH-to-HARQ-timing-indicator indicating a location in time for HARQ feedback associated with the second DL data transmission; setting the location in time of HARQ feedback associated with the first DL data transmission to be the same as the location in time of HARQ feedback associated with the second DL data transmission; and transmitting the HARQ feedback associated with the first DL data transmission at the set location in time.

According to one aspect of the present disclosure, a method, performed by a wireless device, for setting Hybrid Automatic Repeat Request (HARQ) timing for Physical Downlink Shared Channel (PDSCH) with a pending PDSCH-to-HARQ-timing-indicator comprises: receiving a first Downlink Control Information (DCI) associated with a first Downlink (DL) data transmission of a first PDSCH group, the first DCI comprising a numerical PDSCH-to-HARQ-timing-indicator; determining that the numerical PDSCH-to-HARQ-timing-indicator is a predefined value indicating that the corresponding HARQ transmission on a Physical Uplink Control Channel (PUCCH) should be postponed due to a later request for another HARQ transmission on a PUCCH corresponding to another PDSCH.

In some embodiments, the method further comprises receiving a second DCI associated with a second DL data transmission, the second DCI comprising a numerical PDSCH-to-HARQ-timing-indicator indicating a location in time for HARQ feedback associated with the second DL data transmission; setting a location in time of HARQ feedback associated with the first DL data transmission to be the same as the location in time of HARQ feedback associated with the second DL data transmission; and transmitting the HARQ feedback associated with the first DL data transmission at the set location in time.

According to one aspect of the present disclosure, a method, performed by a wireless device, for setting Hybrid Automatic Repeat Request (HARQ) timing for Physical Downlink Shared Channel (PDSCH) with a pending PDSCH-to-HARQ-timing-indicator comprises: receiving a first Downlink Control Information (DCI) associated with a first Downlink (DL) data transmission of a first PDSCH group, the first DCI comprising a numerical PDSCH-to-HARQ-timing-indicator; determining that the numerical PDSCH-to-HARQ-timing-indicator is a predefined value indicating that a corresponding Uplink (UL) HARQ transmission on a Physical Uplink Control Channel (PUCCH) should be sent in a slot or set of symbols that can be dynamically chosen to be used for UL or DL; determining that the slot or set of symbols has been set for DL transmission and thus is unavailable for the corresponding UL HARQ transmission; in response to that determination, postponing the corresponding HARQ transmission.

In some embodiments, the method further comprises receiving a second DCI associated with a second DL data transmission, the second DCI comprising a numerical PDSCH-to-HARQ-timing-indicator indicating a location in time for HARQ feedback associated with the second DL data transmission; setting a location in time of HARQ feedback associated with the first DL data transmission to be the same as the location in time of HARQ feedback associated with the second DL data transmission; and transmitting the HARQ feedback associated with the first DL data transmission at the set location in time.

According to one aspect of the present disclosure, a method, performed by a wireless device, for setting Hybrid Automatic Repeat Request (HARQ) timing for Physical Downlink Shared Channel (PDSCH) with a pending PDSCH-to-HARQ-timing-indicator comprises: receiving a first Downlink Control Information (DCI) associated with a first Downlink (DL) data transmission, the first DCI comprising a numerical PDSCH-to-HARQ-timing-indicator having a predefined value indicating that HARQ transmissions should be delayed until the wireless device has received a DCI comprising a numerical PDSCH-to-HARQ-timing-indicator having a value different from the predefined value; receiving the first DL data transmission; determining a HARQ feedback for the first DL data transmission; receiving a second DCI associated with a second DL data transmission, the second DCI comprising a numerical PDSCH-to-HARQ-timing-indicator indicating a location in time for HARQ feedback associated with the second DL data transmission; setting a location in time of HARQ feedback associated with the first DL data transmission to be the same as the location in time of HARQ feedback associated with the second DL data transmission; and transmitting the HARQ feedback associated with the first DL data transmission at the set location in time.

In some embodiments, the predefined value comprises an existing PDSCH-to-HARQ-timing-indicator value that has been remapped from indicating a delay value to indicating that HARQ transmissions should be delayed until the wireless device has received a DCI comprising a numerical PDSCH-to-HARQ-timing-indicator having a value different from the predefined value.

In some embodiments, prior to receiving the first DCI, the wireless device receives an instruction to remap the existing PDSCH-to-HARQ-timing-indicator value from indicating a delay value to indicating that HARQ transmissions should be delayed until the wireless device has received a DCI comprising a numerical PDSCH-to-HARQ-timing-indicator having a value different from the predefined value.

In some embodiments, the predefined value comprises an additional bit that has been added to an existing PDSCH-to-HARQ-timing-indicator value bit field in the DCI.

According to one aspect of the present disclosure, a method, performed by a base station, for setting Hybrid Automatic Repeat Request (HARQ) timing for Physical Downlink Shared Channel (PDSCH) with a pending PDSCH-to-HARQ-timing-indicator comprises: determining a PDSCH-to-HARQ-timing for an upcoming Downlink (DL) data transmission to a User Equipment (UE); determining that the HARQ feedback for the upcoming DL data transmission should be delayed by the UE until further notification from the base station; and transmitting, to the UE, a first Downlink Control Information (DCI) associated with the upcoming DL data transmission, the first DCI comprising a predefined PDSCH-to-HARQ-timing-indicator value for indicating to the UE that HARQ feedback for the upcoming DL data transmission should be delayed until further notification from the base station.

In some embodiments, determining that the HARQ feedback for the upcoming DL data transmission should be delayed by the UE until further notification from the base station comprises determining that a processing delay from the end of the upcoming DL data transmission to the beginning of the HARQ feedback opportunity is less than a minimum threshold delay.

In some embodiments, the predefined PDSCH-to-HARQ-timing-indicator value comprises a non-numerical value.

In some embodiments, the predefined PDSCH-to-HARQ-timing-indicator value comprises an existing PDSCH-to-HARQ-timing-indicator value that has been remapped from indicating a delay value to indicating that HARQ transmissions should be delayed until a wireless device has received a DCI comprising a numerical PDSCH-to-HARQ-timing-indicator having a value different from the predefined value.

In some embodiments—prior to sending the first DCI, the base station sends, to the UE, an instruction to remap the existing PDSCH-to-HARQ-timing-indicator value from indicating a delay value to indicating that HARQ transmissions should be delayed until the wireless device has received a DCI comprising a numerical PDSCH-to-HARQ-timing-indicator having a value different from the predefined value.

In some embodiments, the predefined PDSCH-to-HARQ-timing-indicator value comprises an additional bit that has been added to an existing PDSCH-to-HARQ-timing-indicator value bit field in the DCI.

In some embodiments, the method further comprises transmitting the further notification to the UE.

In some embodiments, transmitting the further notification to the UE comprises transmitting a second DCI associated with a second DL data transmission, the second DCI comprising a numerical PDSCH-to-HARQ-timing-indicator.

In some embodiments, transmitting the second DCI further comprises transmitting at least one of the following: a HARQ process Identifier (ID); a New Data Indicator (NDI) value; a PDSCH group ID; a Downlink Assignment Indicator (DAI); or a trigger bit.

According to one aspect of the present disclosure, a wireless device for setting Hybrid Automatic Repeat Request (HARQ) timing for Physical Downlink Shared Channel (PDSCH) with a pending PDSCH-to-HARQ-timing-indicator, the wireless device comprising processing circuitry configured to: receive a first Downlink Control Information (DCI) associated with a first Downlink (DL) data transmission, the first DCI comprising a non-numerical PDSCH-to-HARQ-timing-indicator; receive the first DL data transmission; determine a HARQ feedback for the first DL data transmission; receive a second DCI associated with a second DL data transmission, the second DCI comprising a numerical PDSCH-to-HARQ-timing-indicator indicating a location in time for HARQ feedback associated with the second DL data transmission; set a location in time of HARQ feedback associated with the first DL data transmission to be the same as the location in time of HARQ feedback associated with the second DL data transmission; and transmit the HARQ feedback associated with the first DL data transmission at the set location in time.

In some embodiments, the processing circuitry is further configured to perform the steps of any of the wireless device methods disclosed herein.

In some embodiments, the processing circuitry comprises one or more processors and memory storing instructions executable by the one or more processors whereby the wireless device is operable to perform the steps.

According to one aspect of the present disclosure, a base station for setting Hybrid Automatic Repeat Request (HARQ) timing for Physical Downlink Shared Channel (PDSCH) with a pending PDSCH-to-HARQ-timing-indicator, the base station comprising processing circuitry configured to: determine a PDSCH-to-HARQ-timing for an upcoming Downlink (DL) data transmission to a User Equipment (UE); determine that the HARQ feedback for the upcoming DL data transmission should be delayed by the UE until further notification from the base station; and transmit, to the UE, a first Downlink Control Information (DCI) associated with a first DL data transmission, the first DCI comprising a predefined PDSCH-to-HARQ-timing-indicator value for indicating to the UE that HARQ feedback for the first DL data transmission should be delayed until further notification from the base station.

In some embodiments, the processing circuitry is further configured to perform the steps of any of the base station methods disclosed herein.

In some embodiments, the processing circuitry comprises one or more processors and memory storing instructions executable by the one or more processors whereby the wireless device is operable to perform the steps.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 19 is a flowchart illustrating a method implemented in a communication system, in accordance with some embodiments of the present disclosure; and FIG. 20 is a flowchart illustrating a method implemented in a communication system, in accordance with some embodiments of the present disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Figure 1:
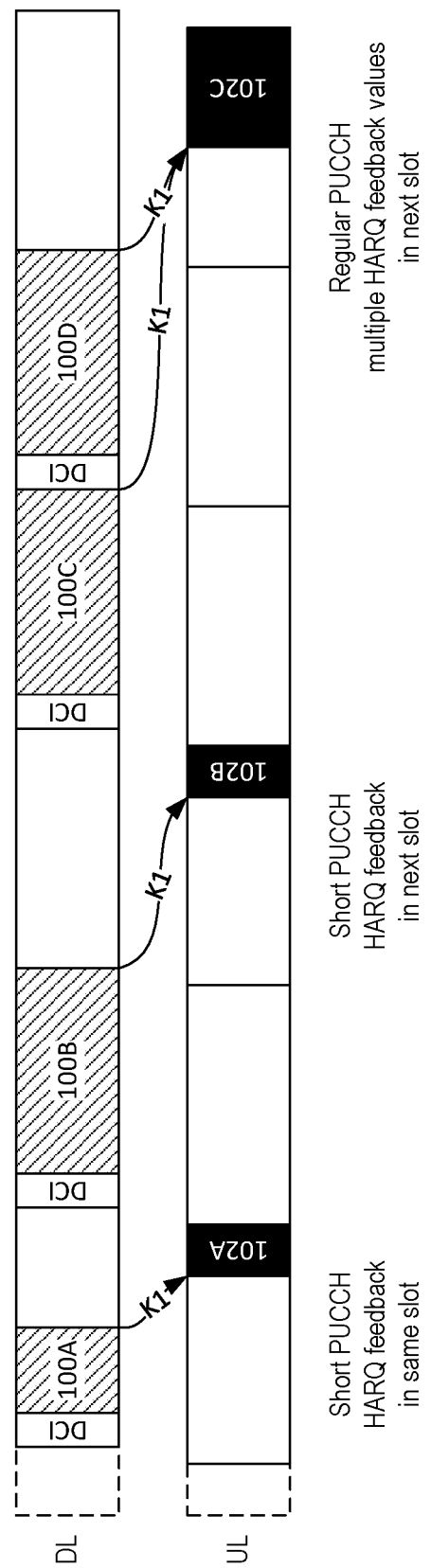
FIG. 1 illustrates HARQ feedback according to a conventional NR system.
Figure 2:
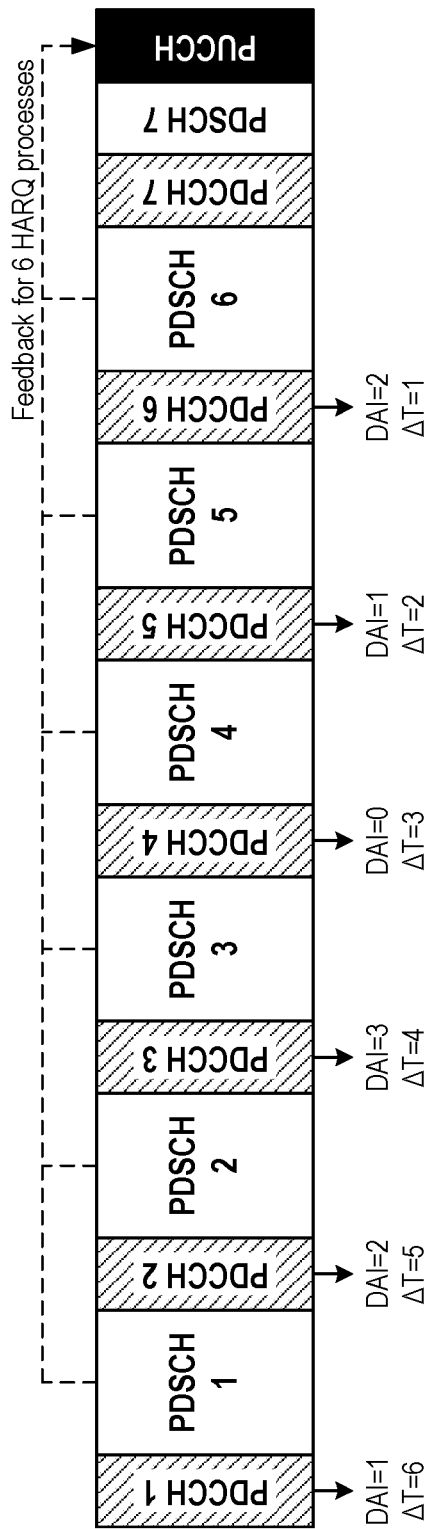
FIG. 2 shows one example of combined HARQ feedback according to a conventional NR system.
Figure 3:
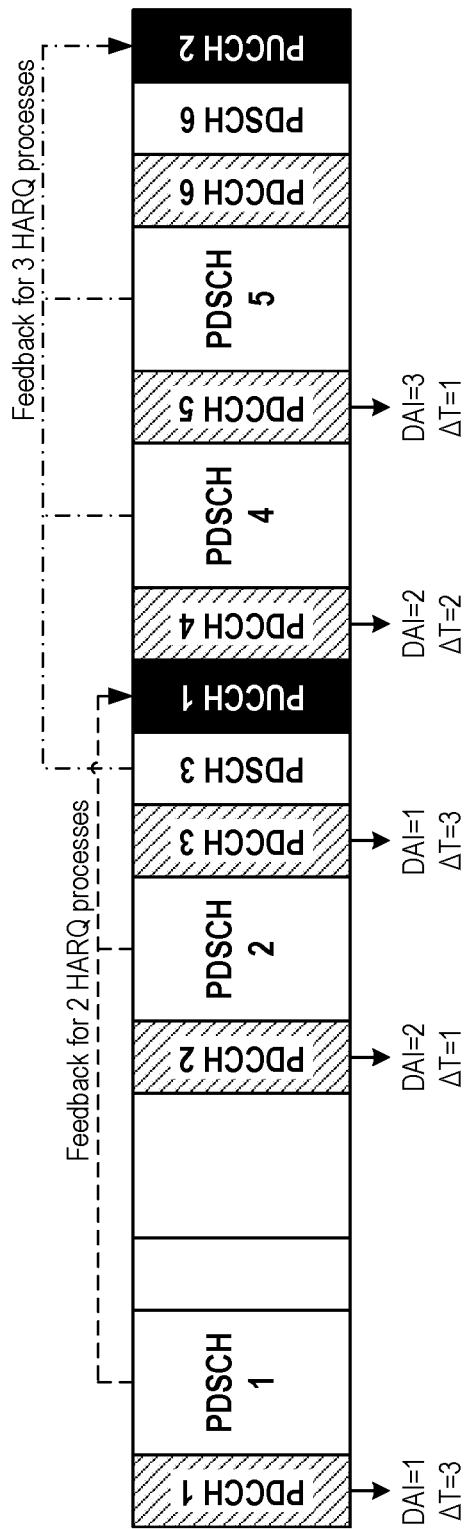
FIG. 3 shows another example of combined HARQ feedback according to a conventional NR system.
Figure 4:
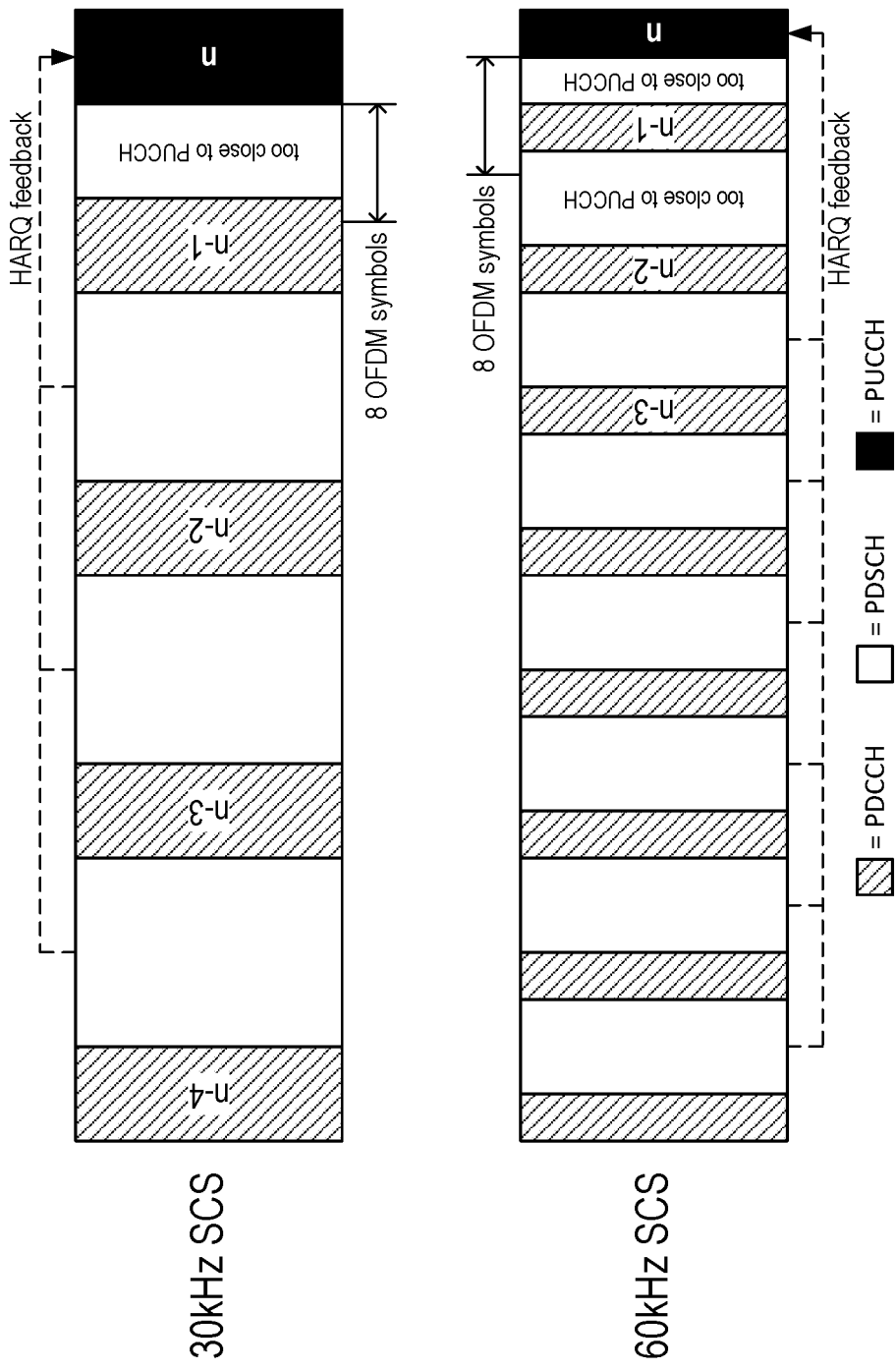
FIG. 4 illustrates one problem suffered by a conventional NR system.
Figure 5:
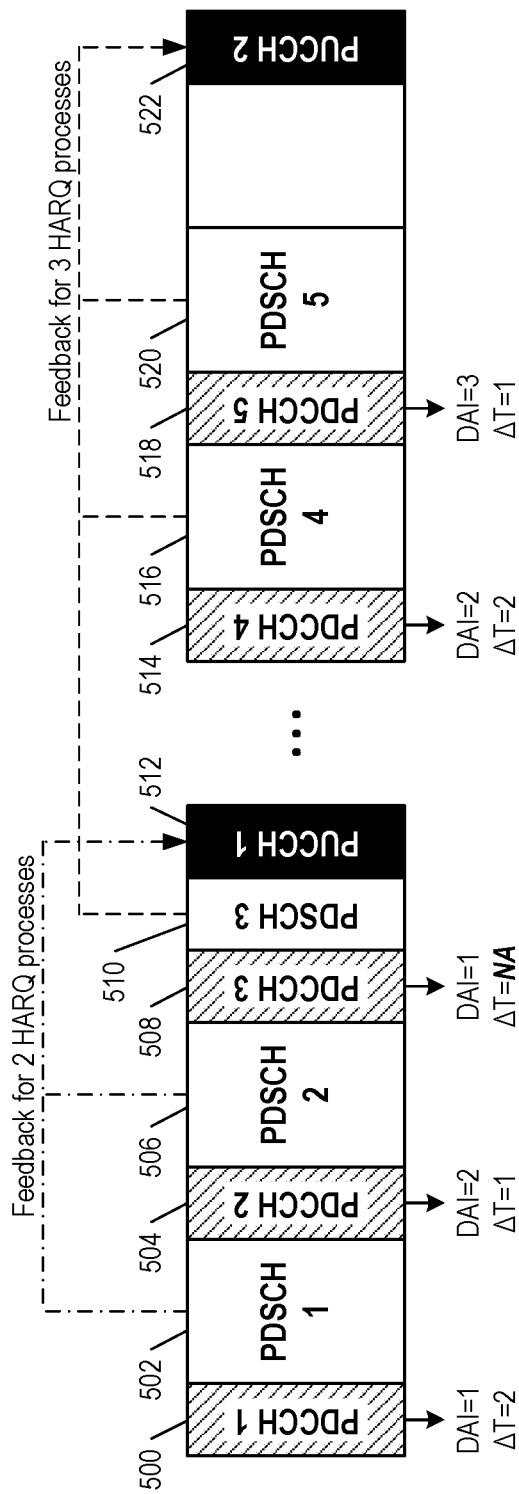
FIG. 5 illustrates setting HARQ timing for PDSCH with a pending PDSCH-to-HARQ-timing-indicator according to some embodiments of the present disclosure.

Setting the PDSCH-to-HARQ-Timing-Indicator for Pending Feedback with Non-Numerical PDSCH-to-HARQ-Timing-Indicator Embodiment 1—Use Next Valid Timing Indicator FIG. 5 illustrates setting Hybrid Automatic Repeat Request (HARQ) timing for Physical Downlink Shared Channel (PDSCH) with a pending PDSCH-to-HARQ-timing-indicator according to some embodiments of the present disclosure. In the embodiment illustrated in FIG. 5, the timing and/or the resources for the pending HARQ-Acknowledgement (ACK) feedback are set to be the same as for the first subsequently transmitted HARQ process with a valid (numerical) PDSCH-to-HARQ-timing-indicator. In FIG. 5, for example, the HARQ timing for PDSCH 3 is set to be the same location in the time domain (referred to herein variously as a "location", "location in time", "time resource", "time", "occasion", "transmission opportunity", and the like) as that pointed to by the PDSCH-to-HARQ-timing-indicator of PDSCH 4, i.e., the location of Physical Uplink Control Channel (PUCCH) 2. Put another way, the HARQ feedback for PDSCH 3 and the HARQ feedback for PDSCH 4 are jointly transmitted in the HARQ feedback opportunity indicated by the numerical PDSCH-to-HARQ-timing indicator for the HARQ feedback for PDSCH 4.

As another aspect of this embodiment, the Downlink Assignment Indicator (DAI) value for the first PDSCH with a valid PDSCH-to-HARQ-timing-indicator (e.g., PDSCH 4) should also count the previous PDSCH(s) with non-numerical PDSCH-to-HARQ-timing-indicator (e.g., PDSCH 3) since the last PDSCH with valid PDSCH-to-HARQ-timing-indicator (e.g., PDSCH 2). In FIG. 5, for example, the value for AT within Physical Downlink Control Channel (PDCCH) 4 should be 2 (representing PDSCH 3 and PDSCH 4) rather than 1 (representing only PDCSH 4).

Figure 6:
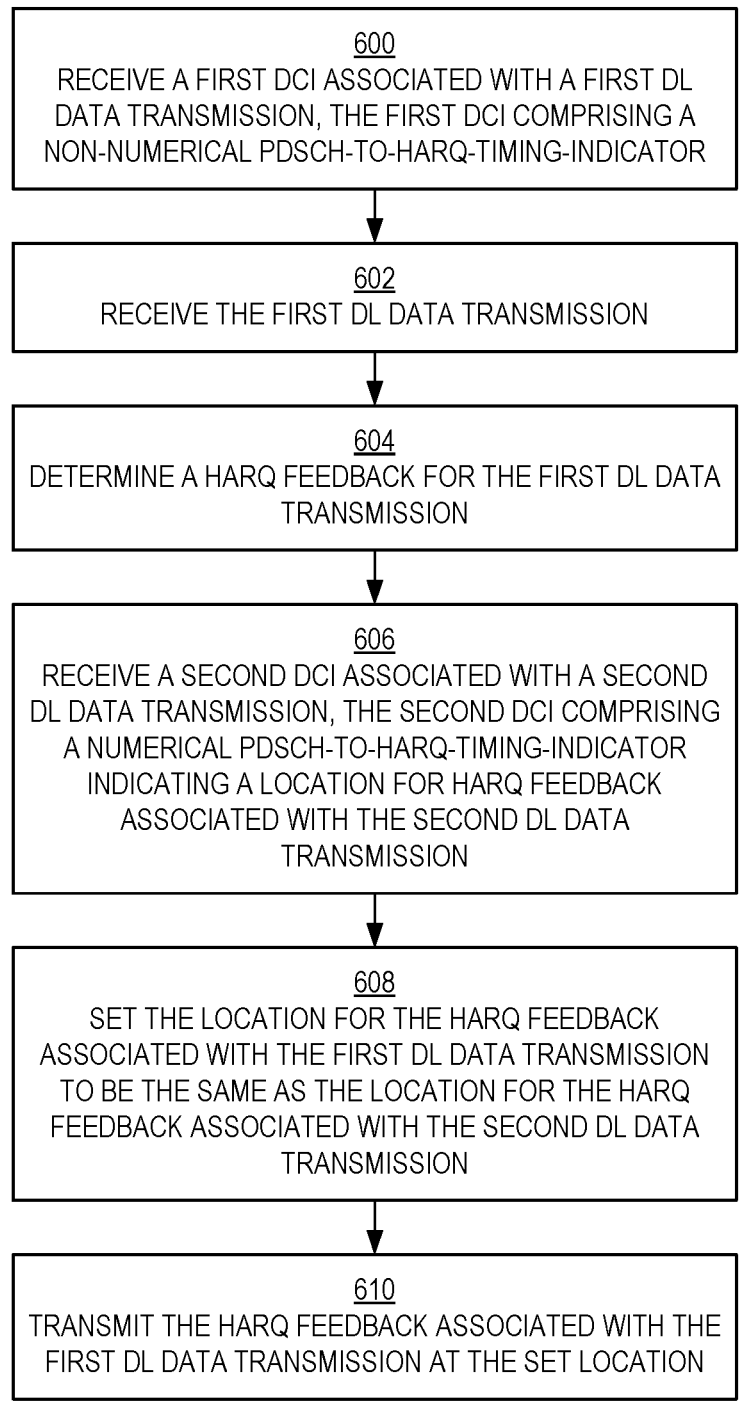
FIG. 6 is a flow chart illustrating steps of an exemplary method for setting HARQ timing for PDSCH with a pending PDSCH-to-HARQ-timing-indicator according to some embodiments of the present disclosure.

FIG. 6 is a flow chart illustrating steps of an exemplary method, performed at a User Equipment (UE), for setting HARQ timing for PDSCH with a pending PDSCH-to-HARQ-timing-indicator according to embodiment 1 of the present disclosure. In the embodiment illustrated in FIG. 6, the process includes the following steps:

Step 600: receive first Downlink Control Information (DCI) associated with a first Downlink (DL) data transmission, the first DCI comprising a non-numerical PDSCH-to-HARQ-timing-indicator;

Step 602: receive the first DL data transmission;

Step 604: determine a HARQ feedback for the first DL data transmission;

Step 606: receive second DCI associated with a second DL data transmission, the second DCI comprising a numerical PDSCH-to-HARQ-timing-indicator indicating a location for HARQ feedback associated with the second DL data transmission;

Step 608: set the location of HARQ feedback associated with the first DL data transmission to be the same as the location of HARQ feedback associated with the second DL data transmission; and Step 610: transmit the HARQ feedback associated with the first DL data transmission at the location set in step 608.

Embodiment 2—Also Consider PDSCH Group

In some embodiments of the present disclosure, if the DCI scheduling the PDSCH supports PDSCH group indication, the timing and/or the resources for the pending HARQ-ACK feedback is set to be the same as the first subsequently transmitted HARQ process that belongs to the same group and with valid (numerical) PDSCH-to-HARQ-timing-indicator.

As another aspect of this embodiment, the DAI value for the first PDSCH with a valid PDSCH-to-HARQ-timing-indicator counts also the previous PDSCH(s) with non-numerical PDSCH-to-HARQ-timing-indicator that belong to the same PDSCH group since the last PDSCH with valid PDSCH-to-HARQ-timing-indicator.

Figure 7:
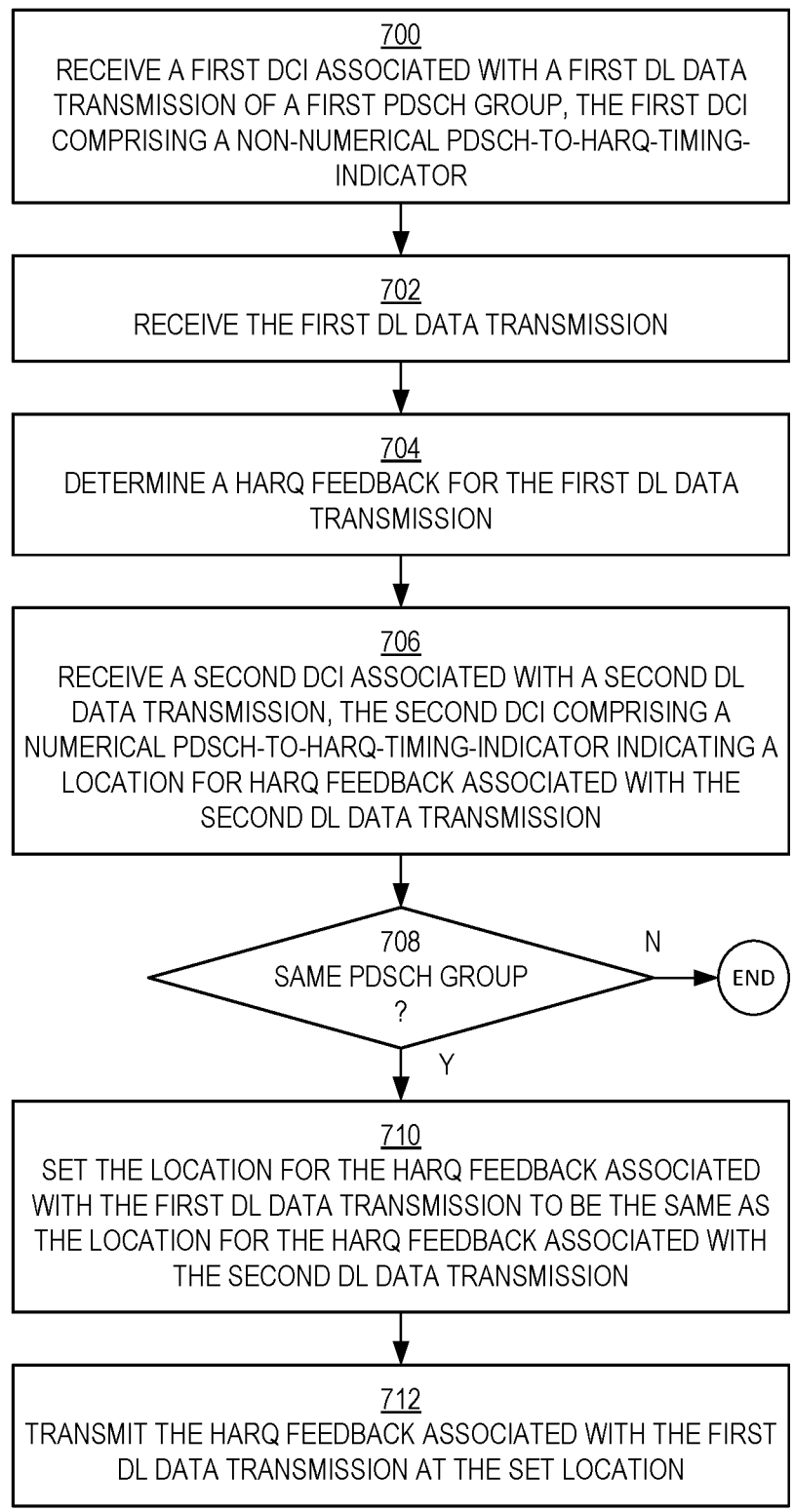
FIG. 7 is a flow chart illustrating steps of an exemplary method for setting HARQ timing for PDSCH with a pending PDSCH-to-HARQ-timing-indicator according to some embodiments of the present disclosure.

FIG. 7 is a flow chart illustrating steps of an exemplary method, performed at a UE, for setting HARQ timing for PDSCH with a pending PDSCH-to-HARQ-timing-indicator according to embodiment 2 of the present disclosure. In the embodiment illustrated in FIG. 7, the process includes the following steps:

Step 700: receive first DCI associated with a first DL data transmission of a first PDSCH group, the first DCI comprising a non-numerical PDSCH-to-HARQ-timing-indicator;

Step 702: receive the first DL data transmission;

Step 704: determine a HARQ feedback for the first DL data transmission;

Step 706: receive second DCI associated with a second DL data transmission, the second DCI comprising a numerical PDSCH-to-HARQ-timing-indicator indicating a location for HARQ feedback associated with the second DL data transmission;

Step 708: determine if the second DL data transmission is of the same PDSCH group as the first DL data transmission. If not, end the process. If so, go to step 710.

Step 710: set the location of HARQ feedback associated with the first DL data transmission to be the same as the location of HARQ feedback associated with the second DL data transmission; and Step 712: transmit the HARQ feedback associated with the first DL data transmission at the location set in step 710.

Embodiment 3—Explicit DCI Signaling

In some embodiments of the present disclosure, a new signaling is defined to indicate timing and the resources for the pending HARQ-ACK feedback (with non-numerical timing indication). For example, in some embodiments, a new UE-specific DCI is transmitted on the PDCCH. Examples include, but are not limited to, the following:

- The DCI indicates at least the HARQ process Identifier(s) (ID(s)) and the PDSCH-to-HARQ-timing-indicator. It might also include New Data Indicator (NDI) values corresponding to the HARQ process ID(s).
- The DCI indicates at least the PDSCH group ID(s), corresponding DAI, and the PDSCH-PDSCH-to-HARQ-timing-indicator.
- The DCI includes a trigger bit, and the PDSCH-to-HARQ-timing-indicator which is applicable to all the PDSCH(s) with a pending or unset PDSCH-to-HARQ-timing-indicator.
  - In some embodiments, the trigger can be part of a DCI that is scheduling another PDSCH. In some embodiments, the PDSCH-to-HARQ-timing-indicator is applicable to the pending and the new PDSCH.
  - In some embodiments, the trigger can be part of a separate DCI that does not schedule PDSCH.

Figure 8:
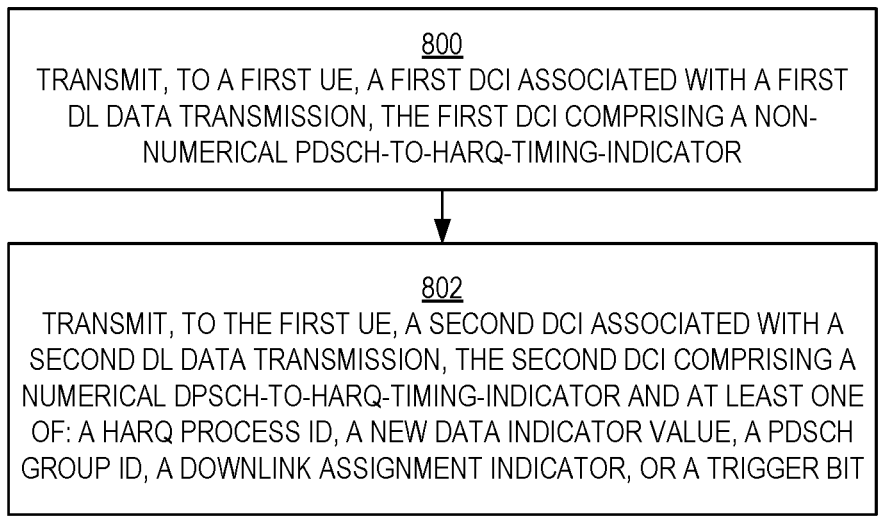
FIG. 8 illustrates a flow chart illustrating steps of an exemplary method for setting HARQ timing for PDSCH with a pending PDSCH-to-HARQ-timing-indicator according to some embodiments of the present disclosure.

FIG. 8 illustrates a flow chart illustrating steps of an exemplary method, performed at a New Radio (NR) base station (gNB), for setting HARQ timing for PDSCH with a pending PDSCH-to-HARQ-timing-indicator according to embodiment 3 of the present disclosure. In the embodiment illustrated in FIG. 8, the process includes the following steps:

Step 800: transmit, to a first UE, a first DCI associated with a first DL data transmission, the first DCI comprising a non-numerical PDSCH-to-HARQ-timing-indicator;

Step 802: transmit, to the first UE, a second DCI associated with a second DL data transmission, the second DCI comprising a numerical PDSCH-to-HARQ-timing-indicator and at least one of the following: at least one HARQ process ID; a NDI value; at least one PDSCH group ID; a corresponding DAI; and/or a trigger bit.

Embodiment 4—Delayed HARQ Despite Numerical Timing Indicator

In some embodiments of the present disclosure, according to predefined rules (e.g., Radio Resource Control (RRC) configuration), the UE is not expected to send the feedback according to the indicated numerical K1 value and is expected to postpone sending the feedback until new timing and resource for the HARQ-ACK feedback is provided by the gNB. Example conditions include, but are not limited to, the following:

Condition 1: The PDSCHs scheduled with a numeric K1 value, resulting in a HARQ-ACK transmission that is too close to a PUCCH to be sent on the PUCCH, e.g., because the required processing time between the end of the PDSCH and the PUCCH cannot be met.
  - In some embodiments, the gNB detects the condition from the lack of HARQ feedback in the indicated PUCCH resource; this can trigger the gNB to signal new HARQ feedback timing, e.g., in accordance with one of the embodiment 3 alternatives, or in a subsequent DCI in accordance with embodiment 2. Yet another alternative is that embodiment 1 is used, in which case the gNB does not have to take any explicit signaling action to resolve the situation, but will have to be prepared to receive the HARQ feedback in accordance with embodiment 1.
  - In some embodiments, as an alternative to using lack of HARQ feedback as a sign of delayed HARQ feedback, the UE, when the processing time is too short for providing "real" HARQ feedback, instead provides an indication (on the PUCCH indicated by the numerical K1) which informs the gNB that the UE has postponed the HARQ feedback (e.g., because of lack of processing time). This would be a new type of indication to be standardized.

Condition 2: The PDSCHs scheduled with a numeric K1 value, that the corresponding HARQ-ACK transmission on a PUCCH should be postponed, due to a later request for another HARQ-ACK transmission on a PUCCH corresponding to another PDSCH(s)

Condition 3: A PDSCH is scheduled with a numerical K1 value, indicating that HARQ feedback should be sent in a dynamic slot or a set of dynamic symbols (i.e., symbols that can be used for either Uplink (UL) or DL transmissions as dynamically chosen by the gNB), and the gNB later allocates these symbols (or this slot) for DL transmission. In this case, the postponed HARQ feedback can be handled in accordance with embodiment 3, 2 or 1 in the same ways as described above for condition 1.

Figure 9:
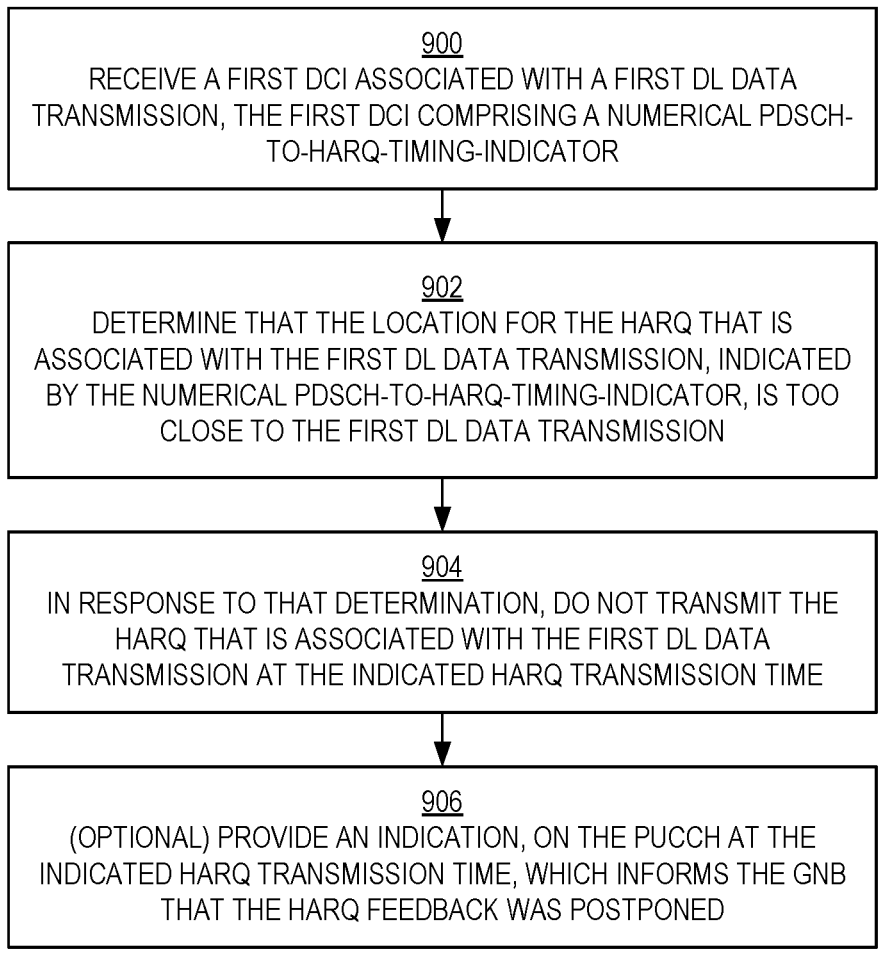
FIG. 9 illustrates a flow chart illustrating steps of an exemplary method for setting HARQ timing for PDSCH with a pending PDSCH-to-HARQ-timing-indicator according to some embodiments of the present disclosure.

FIG. 9 illustrates a flow chart illustrating steps of an exemplary method, performed at a UE, for setting HARQ timing for PDSCH with a pending PDSCH-to-HARQ-timing-indicator according to embodiment 4, condition 1, of the present disclosure. In the embodiment illustrated in FIG. 9, the process includes the following steps:

Step 900: receive first DCI associated with a first DL data transmission of a first PDSCH group, the first DCI comprising a numerical PDSCH-to-HARQ-timing-indicator;

Step 902: determine that the location for the HARQ that is associated with the first dl data transmission, indicated by the numerical PDSCH-to-HARQ-timing-indicator, is too close to the first DL data transmission; and Step 904: in response to that determination, do not transmit the HARQ that is associated with the first DL data transmission at the indicated HARQ transmission time;

Step 906: optionally, provide an indication, on the PUCCH at the indicated HARQ transmission time, which informs the gNB that the HARQ feedback was postponed.

Embodiment 5—Modified or Extended PDSCH-to-HARQ-Timing-Indicator Field

In some embodiments of the present disclosure, the exiting PDSCH-to-HARQ-timing-indicator field in NR Release (Rel-) 15 is modified or extended. Example embodiments include, but are not limited to, the following:

In one embodiment, the DCI format 1_0, the PDSCH-to-HARQ-timing-indicator field in NR Rel-15 is 3 bits with values mapping to $\{1, 2, 3, 4, 5, 6, 7, 8\}$ in number of slots, but for the NR-U use case, the field is extended by 1 bit, providing 16 possible HARQ feedback timing offset values. One of the 16 values (e.g. 0b1111) can be used as non-numerical value to indicate pending HARQ feedback transmission until further notice, and the remaining 15 values can be used to provide further HARQ feedback scheduling flexibility.

In an alternative embodiment, the PDSCH-to-HARQ-timing-indicator remains at 3 bits, but one of the current values (e.g. 0b111) is redefined as non-numerical for NR-U to indicate pending HARQ feedback transmission until further notice.

In either of the embodiments described above, the modification or extension of the PDSCH-to-HARQ-timing-indicator field and/or the re-interpretation of one of the values to the non-numerical value can be configurable by higher layers.

Figure 10:
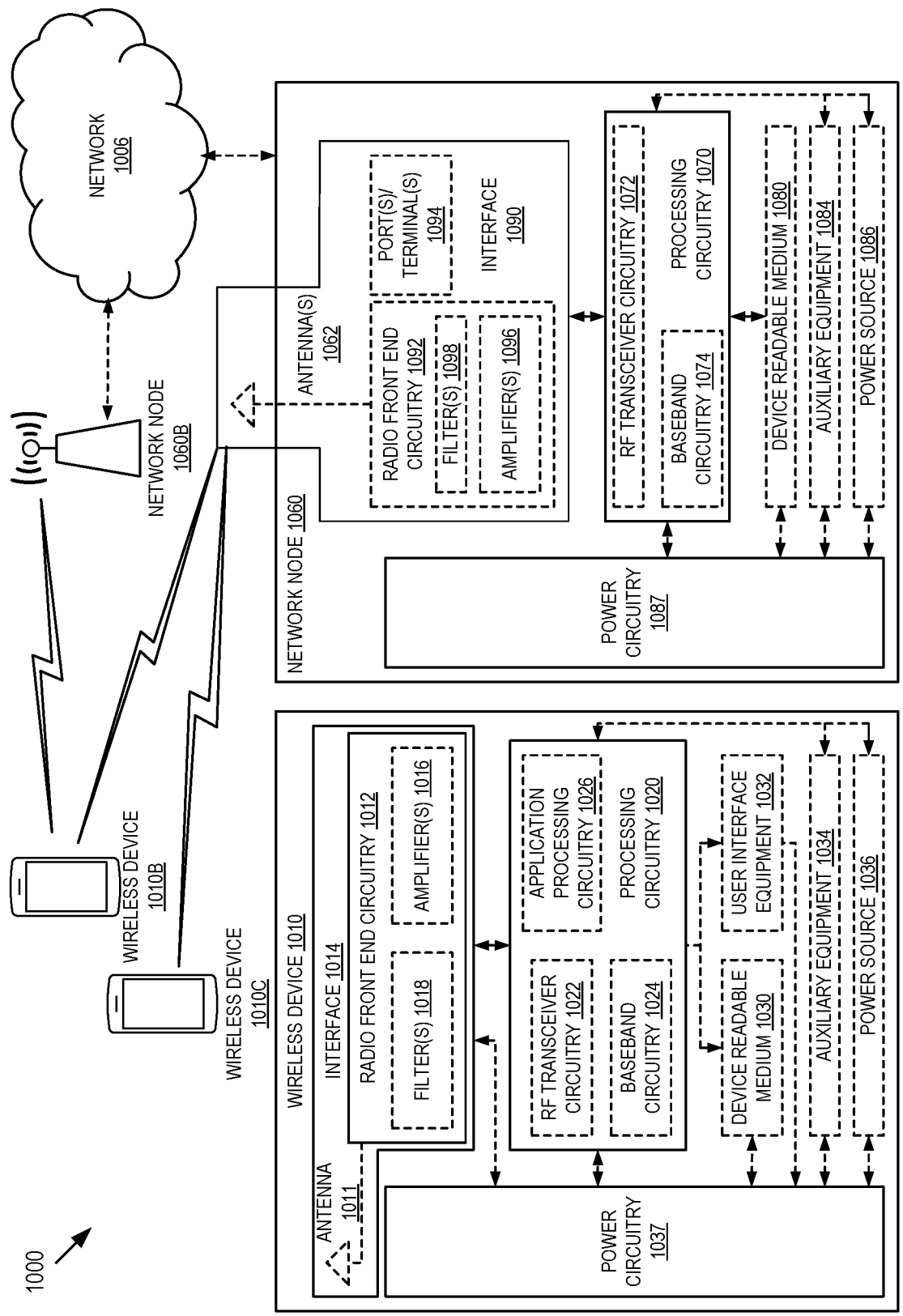
FIG. 10 illustrates one example of a cellular communications system in which embodiments of the present disclosure may be implemented.

Although the subject matter described herein may be implemented in any appropriate type of system using any suitable components, the embodiments disclosed herein are described in relation to a wireless network, such as the example wireless network illustrated in FIG. 10.

FIG. 10 illustrates one example of a cellular communications system 1000 in which embodiments of the present disclosure may be implemented. For simplicity, the wireless network of FIG. 10 only depicts a network 1006, network nodes 1060 and 1060B, and Wireless Devices (WDs) 1010, 1010B, and 1010C. In practice, a wireless network may further include any additional elements suitable to support communication between wireless devices or between a wireless device and another communication device, such as a landline telephone, a service provider, or any other network node or end device. Of the illustrated components, the network node 1060 and the WD 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable Second, Third, Fourth, or Fifth Generation (2G, 3G, 4G, or 5G) standards; Wireless Local Area Network (WLAN) standards, such as the IEEE 802.11 standards; and/or any other appropriate wireless communication standard, such as the Worldwide Interoperability for Microwave Access (WiMax), Bluetooth, Z-Wave, and/or ZigBee standards.

The network 1006 may comprise one or more backhaul networks, core networks, Internet Protocol (IP) networks, Public Switched Telephone Networks (PSTNs), packet data networks, optical networks, Wide Area Networks (WANs), Local Area Networks (LANs), WLANs, wired networks, wireless networks, metropolitan area networks, and other networks to enable communication between devices.

The network node 1060 and the WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, Access Points (APs) (e.g., radio APs), Base Stations (BSs) (e.g., radio base stations, Node Bs, evolved Node Bs (eNBs), and New Radio (NR) base stations (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or Remote Radio Units (RRUs), sometimes referred to as Remote Radio Heads (RRHs). Such RRUs may or may not be integrated with an antenna as an antenna integrated radio. Parts of a distributed radio base station may also be referred to as nodes in a Distributed Antenna System (DAS). Yet further examples of network nodes include Multi-Standard Radio (MSR) equipment such as MSR BSs, network controllers such as Radio Network Controllers (RNCs) or BS Controllers (BSCs), Base Transceiver Stations (BTSs), transmission points, transmission nodes, Multi-Cell/Multicast Coordination Entities (MCEs), core network nodes (e.g., Mobile Switching Centers (MSCs), Mobility Management Entities (MMEs)), Operation and Maintenance (O&M) nodes, Operations Support System (OSS) nodes, Self-Organizing Network (SON) nodes, positioning nodes (e.g., Evolved Serving Mobile Location Center (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, the network node 1060 includes processing circuitry 1070, a device readable medium 1080, an interface 1090, auxiliary equipment 1084, a power source 1086, power circuitry 1087, and an antenna 1062. Although the network node 1060 illustrated in the example wireless network of FIG. 10 may represent a device that includes the illustrated combination of hardware components, some embodiments may comprise network nodes with different combinations of components. It is to be understood that a network node comprises any suitable combination of hardware and/or software needed to perform the tasks, features, functions, and methods disclosed herein. Moreover, while the components of the network node 1060 are depicted as single boxes located within a larger box, or nested within multiple boxes, in practice, a network node may comprise multiple different physical components that make up a single illustrated component (e.g., the device readable medium 1080 may comprise multiple separate hard drives as well as multiple Random Access Memory (RAM) modules).

Similarly, the network node 1060 may be composed of multiple physically separate components (e.g., a Node B component and a RNC component, or a BTS component and a BSC component, etc.), which may each have their own respective components. In certain scenarios in which the network node 1060 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, the network node

1060 may be configured to support multiple Radio Access Technologies (RATs). In such embodiments, some components may be duplicated (e.g., a separate device readable medium 1080 for the different RATs) and some components may be reused (e.g., the same antenna 1062 may be shared by the RATs). The network node 1060 may also include multiple sets of the various illustrated components for different wireless technologies integrated into the network node 1060, such as, for example, GSM, Wideband Code Division Multiple Access (WCDMA), LTE, NR, WiFi, or Bluetooth wireless technologies. These wireless technologies may be integrated into the same or a different chip or set of chips and other components within the network node 1060.

The processing circuitry 1070 is configured to perform any determining, calculating, or similar operations (e.g., certain obtaining operations) described herein as being provided by a network node. These operations performed by the processing circuitry 1070 may include processing information obtained by the processing circuitry 1070 by, for example, converting the obtained information into other information, comparing the obtained information or converted information to information stored in the network node, and/or performing one or more operations based on the obtained information or converted information, and as a result of said processing making a determination.

The processing circuitry 1070 may comprise a combination of one or more of a microprocessor, a controller, a microcontroller, a Central Processing Unit (CPU), a Digital Signal Processor (DSP), an Application Specific Integrated Circuit (ASIC), a Field Programmable Gate Array (FPGA), or any other suitable computing device, resource, or combination of hardware, software, and/or encoded logic operable to provide, either alone or in conjunction with other network node 1060 components, such as the device readable medium 1080, network node 1060 functionality. For example, the processing circuitry 1070 may execute instructions stored in the device readable medium 1080 or in memory within the processing circuitry 1070. Such functionality may include providing any of the various wireless features, functions, or benefits discussed herein. In some embodiments, the processing circuitry 1070 may include a System on a Chip (SOC).

In some embodiments, the processing circuitry 1070 may include one or more of Radio Frequency (RF) transceiver circuitry 1072 and baseband processing circuitry 1074. In some embodiments, the RF transceiver circuitry 1072 and the baseband processing circuitry 1074 may be on separate chips (or sets of chips), boards, or units, such as radio units and digital units. In alternative embodiments, part or all of the RF transceiver circuitry 1072 and the baseband processing circuitry 1074 may be on the same chip or set of chips, boards, or units.

In certain embodiments, some or all of the functionality described herein as being provided by a network node, base station, eNB, or other such network device may be performed by the processing circuitry 1070 executing instructions stored on the device readable medium 1080 or memory within the processing circuitry 1070. In alternative embodiments, some or all of the functionality may be provided by the processing circuitry 1070 without executing instructions stored on a separate or discrete device readable medium, such as in a hard-wired manner. In any of those embodiments, whether executing instructions stored on a device readable storage medium or not, the processing circuitry 1070 can be configured to perform the described functionality. The benefits provided by such functionality are not limited to the processing circuitry 1070 alone or to other components of the network node 1060, but are enjoyed by the network node 1060 as a whole, and/or by end users and the wireless network generally.

The device readable medium 1080 may comprise any form of volatile or non-volatile computer readable memory including, without limitation, persistent storage, solid state memory, remotely mounted memory, magnetic media, optical media, RAM, Read Only Memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by the processing circuitry 1070. The device readable medium 1080 may store any suitable instructions; data or information, including a computer program; software; an application including one or more of logic, rules, code, tables, etc.; and/or other instructions capable of being executed by the processing circuitry 1070 and utilized by the network node 1060. The device readable medium 1080 may be used to store any calculations made by the processing circuitry 1070 and/or any data received via the interface 1090. In some embodiments, the processing circuitry 1070 and the device readable medium 1080 may be considered to be integrated.

The interface 1090 is used in the wired or wireless communication of signaling and/or data between the network node 1060, a network 1006, and/or WDs 1010. As illustrated, the interface 1090 comprises port(s)/terminal(s) 1094 to send and receive data, for example to and from the network 1006 over a wired connection. The interface 1090 also includes radio front end circuitry 1092 that may be coupled to, or in certain embodiments a part of, the antenna 1062. The radio front end circuitry 1092 comprises filters 1098 and amplifiers 1096. The radio front end circuitry 1092 may be connected to the antenna 1062 and the processing circuitry 1070. The radio front end circuitry 1092 may be configured to condition signals communicated between the antenna 1062 and the processing circuitry 1070. The radio front end circuitry 1092 may receive digital data that is to be sent out to other network nodes or WDs via a wireless connection. The radio front end circuitry 1092 may convert the digital data into a radio signal having the appropriate channel and bandwidth parameters using a combination of the filters 1098 and/or the amplifiers 1096. The radio signal may then be transmitted via the antenna 1062. Similarly, when receiving data, the antenna 1062 may collect radio signals which are then converted into digital data by the radio front end circuitry 1092. The digital data may be passed to the processing circuitry 1070. In some embodiments, the interface 1090 may comprise different components and/or different combinations of components.

In certain alternative embodiments, the network node 1060 may not include separate radio front end circuitry 1092; instead, the processing circuitry 1070 may comprise radio front end circuitry and may be connected to the antenna 1062 without separate radio front end circuitry 1092. Similarly, in some embodiments, all or some of the RF transceiver circuitry 1072 may be considered a part of the interface 1090. In still some embodiments, the interface 1090 may include the one or more ports or terminals 1094, the radio front end circuitry 1092, and the RF transceiver circuitry 1072 as part of a radio unit (not shown), and the interface 1090 may communicate with the baseband processing circuitry 1074, which is part of a digital unit (not shown).

The antenna 1062 may include one or more antennas, or antenna arrays, configured to send and/or receive wireless signals. The antenna 1062 may be coupled to the radio front end circuitry 1092 and may be any type of antenna capable of transmitting and receiving data and/or signals wirelessly. In some embodiments, the antenna 1062 may comprise one or more omni-directional, sector, or panel antennas operable to transmit/receive radio signals between, for example, 2 gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multiple Input Multiple Output (MIMO). In certain embodiments, the antenna 1062 may be separate from the network node 1060 and may be connectable to the network node 1060 through an interface or port.

The antenna 1062, the interface 1090, and/or the processing circuitry 1070 may be configured to perform any receiving operations and/or certain obtaining operations described herein as being performed by a network node. Any information, data, and/or signals may be received from a WD, another network node, and/or any other network equipment. Similarly, the antenna 1062, the interface 1090, and/or the processing circuitry 1070 may be configured to perform any transmitting operations described herein as being performed by a network node. Any information, data, and/or signals may be transmitted to a WD, another network node, and/or any other network equipment.

The power circuitry 1087 may comprise, or be coupled to, power management circuitry and is configured to supply the components of the network node 1060 with power for performing the functionality described herein. The power circuitry 1087 may receive power from the power source 1086. The power source 1086 and/or the power circuitry 1087 may be configured to provide power to the various components of the network node 1060 in a form suitable for the respective components (e.g., at a voltage and current level needed for each respective component). The power source 1086 may either be included in, or be external to, the power circuitry 1087 and/or the network node 1060. For example, the network node 1060 may be connectable to an external power source (e.g., an electricity outlet) via an input circuitry or interface such as an electrical cable, whereby the external power source supplies power to the power circuitry 1087. As a further example, the power source 1086 may comprise a source of power in the form of a battery or battery pack which is connected to, or integrated in, the power circuitry 1087. The battery may provide backup power should the external power source fail. Other types of power sources, such as photovoltaic devices, may also be used.

Alternative embodiments of the network node 1060 may include additional components beyond those shown in FIG. 10 that may be responsible for providing certain aspects of the network node's functionality, including any of the functionality described herein and/or any functionality necessary to support the subject matter described herein. For example, the network node 1060 may include user interface equipment to allow input of information into the network node 1060 and to allow output of information from the network node 1060. This may allow a user to perform diagnostic, maintenance, repair, and other administrative functions for the network node 1060.

As used herein, WD refers to a device capable, configured, arranged, and/or operable to communicate wirelessly with network nodes and/or other WDs. Unless otherwise noted, the term WD may be used interchangeably herein with User Equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE), a vehicle mounted wireless terminal device, etc. A WD may support Device-to-Device (D2D) communication, for example by implementing a 3G Partnership Project (3GPP) standard for sidelink communication, Vehicle-to-Vehicle (V2V), Vehicle-to-Infrastructure (V2I), Vehicle-to-Everything (V2X), and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a Machine-to-Machine (M2M) device, which may in a 3GPP context be referred to as a Machine-Type Communication (MTC) device. As one particular example, the WD may be a UE implementing the 3GPP Narrowband IoT (NB-IoT) standard. Particular examples of such machines or devices are sensors, metering devices such as power meters, industrial machinery, home or personal appliances (e.g., refrigerators, televisions, etc.), or personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated in FIG. 10, a WD 1010 includes an antenna 1011, an interface 1014, processing circuitry 1020, a device readable medium 1030, user interface equipment 1032, auxiliary equipment 1034, a power source 1036, and power circuitry 1037. The WD 1010 may include multiple sets of one or more of the illustrated components for different wireless technologies supported by the WD 1010, such as, for example, GSM, WCDMA, LTE, NR, WiFi, WiMAX, or Bluetooth wireless technologies, just to mention a few. These wireless technologies may be integrated into the same or different chips or set of chips as other components within the WD 1010.

The antenna 1011 may include one or more antennas or antenna arrays configured to send and/or receive wireless signals and is connected to the interface 1014. In certain alternative embodiments, the antenna 1011 may be separate from the WD 1010 and be connectable to the WD 1010 through an interface or port. The antenna 1011, the interface 1014, and/or the processing circuitry 1020 may be configured to perform any receiving or transmitting operations described herein as being performed by a WD. Any information, data, and/or signals may be received from a network node and/or another WD. In some embodiments, radio front end circuitry and/or the antenna 1011 may be considered an interface.

As illustrated, the interface 1014 comprises radio front end circuitry 1012 and the antenna 1011. The radio front end circuitry 1012 comprises one or more filters 1018 and amplifiers 1016. The radio front end circuitry 1012 is connected to the antenna 1011 and the processing circuitry 1020 and is configured to condition signals communicated between the antenna 1011 and the processing circuitry 1020. The radio front end circuitry 1012 may be coupled to or be a part of the antenna 1011. In some embodiments, the WD 1010 may not include separate radio front end circuitry 1012; rather, the processing circuitry 1020 may comprise radio front end circuitry and may be connected to the antenna 1011. Similarly, in some embodiments, some or all of RF transceiver circuitry 1022 may be considered a part of the interface 1014. The radio front end circuitry 1012 may receive digital data that is to be sent out to other network nodes or WDs via a wireless connection. The radio front end circuitry 1012 may convert the digital data into a radio signal having the appropriate channel and bandwidth parameters using a combination of the filters 1018 and/or the amplifiers 1016. The radio signal may then be transmitted via the antenna 1011. Similarly, when receiving data, the antenna 1011 may collect radio signals which are then converted into digital data by the radio front end circuitry 1012. The digital data may be passed to the processing circuitry 1020. In some embodiments, the interface 1014 may comprise different components and/or different combinations of components.

The processing circuitry 1020 may comprise a combination of one or more of a microprocessor, a controller, a microcontroller, a CPU, a DSP, an ASIC, a FPGA, or any other suitable computing device, resource, or combination of hardware, software, and/or encoded logic operable to provide, either alone or in conjunction with other WD 1010 components, such as the device readable medium 1030, WD 1010 functionality. Such functionality may include providing any of the various wireless features or benefits discussed herein. For example, the processing circuitry 1020 may execute instructions stored in the device readable medium 1030 or in memory within the processing circuitry 1020 to provide the functionality disclosed herein.

As illustrated, the processing circuitry 1020 includes one or more of the RF transceiver circuitry 1022, baseband processing circuitry 1024, and application processing circuitry 1026. In some embodiments, the processing circuitry 1020 may comprise different components and/or different combinations of components. In certain embodiments, the processing circuitry 1020 of the WD 1010 may comprise a SOC. In some embodiments, the RF transceiver circuitry 1022, the baseband processing circuitry 1024, and the application processing circuitry 1026 may be on separate chips or sets of chips. In alternative embodiments, part or all of the baseband processing circuitry 1024 and the application processing circuitry 1026 may be combined into one chip or set of chips, and the RF transceiver circuitry 1022 may be on a separate chip or set of chips. In still alternative embodiments, part or all of the RF transceiver circuitry 1022 and the baseband processing circuitry 1024 may be on the same chip or set of chips, and the application processing circuitry 1026 may be on a separate chip or set of chips. In yet other alternative embodiments, part or all of the RF transceiver circuitry 1022, the baseband processing circuitry 1024, and the application processing circuitry 1026 may be combined in the same chip or set of chips. In some embodiments, the RF transceiver circuitry 1022 may be a part of the interface 1014. The RF transceiver circuitry 1022 may condition RF signals for the processing circuitry 1020.

In certain embodiments, some or all of the functionality described herein as being performed by a WD may be provided by the processing circuitry 1020 executing instructions stored on the device readable medium 1030, which in certain embodiments may be a computer-readable storage medium. In alternative embodiments, some or all of the functionality may be provided by the processing circuitry 1020 without executing instructions stored on a separate or discrete device readable storage medium, such as in a hard-wired manner. In any of those particular embodiments, whether executing instructions stored on a device readable storage medium or not, the processing circuitry 1020 can be configured to perform the described functionality. The benefits provided by such functionality are not limited to the processing circuitry 1020 alone or to other components of the WD 1010, but are enjoyed by the WD 1010 as a whole, and/or by end users and the wireless network generally.

The processing circuitry 1020 may be configured to perform any determining, calculating, or similar operations (e.g., certain obtaining operations) described herein as being performed by a WD. These operations, as performed by the processing circuitry 1020, may include processing information obtained by the processing circuitry 1020 by, for example, converting the obtained information into other information, comparing the obtained information or converted information to information stored by the WD 1010, and/or performing one or more operations based on the obtained information or converted information, and as a result of said processing making a determination.

The device readable medium 1030 may be operable to store a computer program; software; an application including one or more of logic, rules, code, tables, etc.; and/or other instructions capable of being executed by the processing circuitry 1020. The device readable medium 1030 may include computer memory (e.g., RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by the processing circuitry 1020. In some embodiments, the processing circuitry 1020 and the device readable medium 1030 may be considered to be integrated.

The user interface equipment 1032 may provide components that allow for a human user to interact with the WD 1010. Such interaction may be of many forms, such as visual, audial, tactile, etc. The user interface equipment 1032 may be operable to produce output to the user and to allow the user to provide input to the WD 1010. The type of interaction may vary depending on the type of user interface equipment 1032 installed in the WD 1010. For example, if the WD 1010 is a smart phone, the interaction may be via a touch screen; if the WD 1010 is a smart meter, the interaction may be through a screen that provides usage (e.g., the number of gallons used) or a speaker that provides an audible alert (e.g., if smoke is detected). The user interface equipment 1032 may include input interfaces, devices and circuits, and output interfaces, devices and circuits. The user interface equipment 1032 is configured to allow input of information into the WD 1010, and is connected to the processing circuitry 1020 to allow the processing circuitry 1020 to process the input information. The user interface equipment 1032 may include, for example, a microphone, a proximity or other sensor, keys/buttons, a touch display, one or more cameras, a Universal Serial Bus (USB) port, or other input circuitry. The user interface equipment 1032 is also configured to allow output of information from the WD 1010 and to allow the processing circuitry 1020 to output information from the WD 1010. The user interface equipment 1032 may include, for example, a speaker, a display, vibrating circuitry, a USB port, a headphone interface, or other output circuitry. Using one or more input and output interfaces, devices, and circuits of the user interface equipment 1032, the WD 1010 may communicate with end users and/or the wireless network, and allow them to benefit from the functionality described herein.

The auxiliary equipment 1034 is operable to provide more specific functionality which may not be generally performed by WDs. This may comprise specialized sensors for doing measurements for various purposes, interfaces for additional types of communication such as wired communications, etc. The inclusion and type of components of the auxiliary equipment 1034 may vary depending on the embodiment and/or scenario.

The power source 1036 may, in some embodiments, be in the form of a battery or battery pack. Other types of power sources, such as an external power source (e.g., an electricity outlet), photovoltaic devices, or power cells may also be used. The WD 1010 may further comprise the power circuitry 1037 for delivering power from the power source 1036 to the various parts of the WD 1010 which need power from the power source 1036 to carry out any functionality described or indicated herein. The power circuitry 1037 may in certain embodiments comprise power management circuitry. The power circuitry 1037 may additionally or alternatively be operable to receive power from an external power source, in which case the WD 1010 may be connectable to the external power source (such as an electricity outlet) via input circuitry or an interface such as an electrical power cable. The power circuitry 1037 may also in certain embodiments be operable to deliver power from an external power source to the power source 1036. This may be, for example, for the charging of the power source 1036. The power circuitry 1037 may perform any formatting, converting, or other modification to the power from the power source 1036 to make the power suitable for the respective components of the WD 1010 to which power is supplied.

Figure 11:
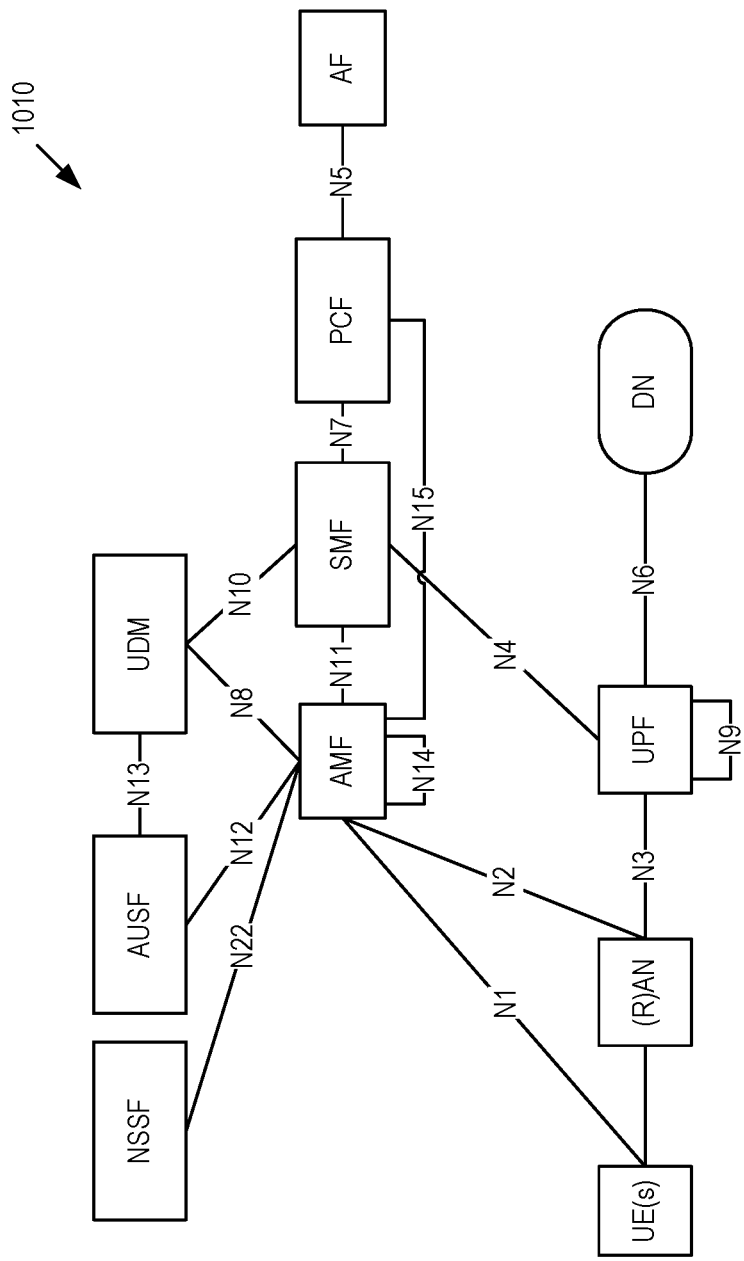
FIG. 11 illustrates a wireless communication system represented as a 5G network architecture composed of core Network Functions (NFs), where interaction between any two NFs is represented by a point-to-point reference point/interface.

FIG. 11 illustrates a wireless communication system represented as a 5G network architecture composed of core Network Functions (NFs), where interaction between any two NFs is represented by a point-to-point reference point/interface. FIG. 11 can be viewed as one particular implementation of the system 1000 of FIG. 10.

Seen from the access side the 5G network architecture shown in FIG. 11 comprises a plurality of User Equipment (UEs) connected to either a Radio Access Network (RAN) or an Access Network (AN) as well as an Access and Mobility Management Function (AMF). Typically, the R(AN) comprises base stations, e.g., such as evolved Node Bs (eNBs) or NR base stations (gNBs) or similar. Seen from the core network side, the 5G core NFs shown in FIG. 11 include a Network Slice Selection Function (NSSF), an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMP, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 11, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 11. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 12:
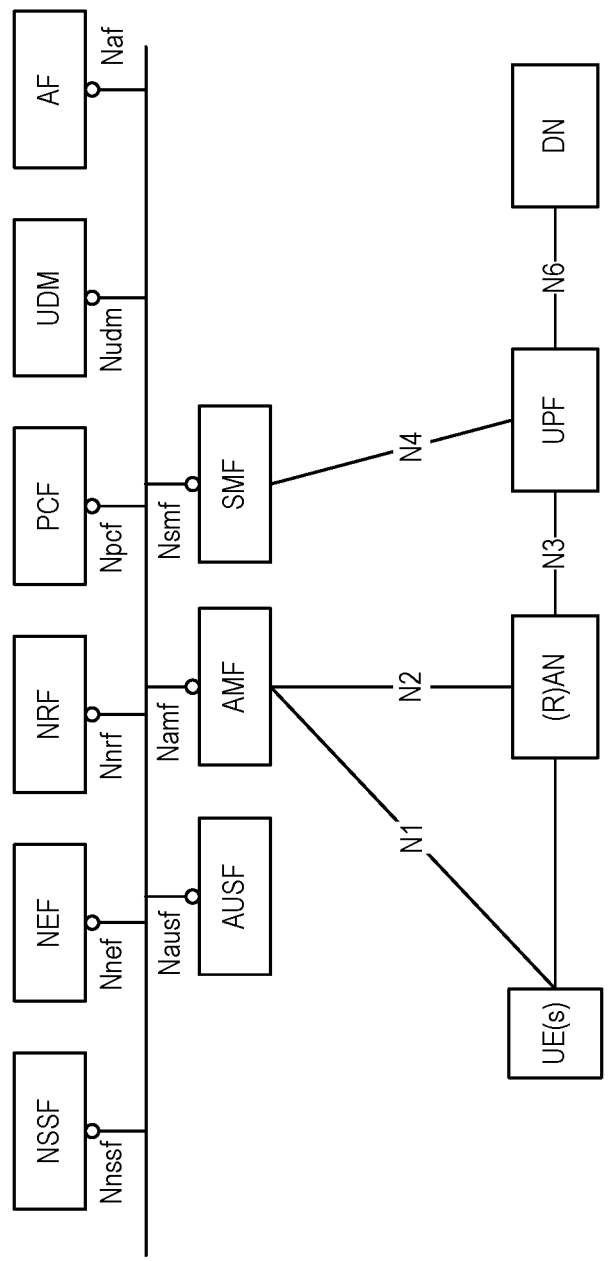
FIG. 12 illustrates a 5G network architecture using service-based interfaces between the NFs in the control plane, instead of the point-to-point reference points/interfaces used in the 5G network architecture of FIG. 11.

FIG. 12 illustrates a 5G network architecture using service-based interfaces between the NFs in the control plane, instead of the point-to-point reference points/interfaces used in the 5G network architecture of FIG. 11. However, the NFs described above with reference to FIG. 11 correspond to the NFs shown in FIG. 12. The service(s) etc. that a NF provides to other authorized NFs can be exposed to the authorized NFs through the service-based interface. In FIG. 12 the service based interfaces are indicated by the letter "N" followed by the name of the NF, e.g., Namf for the service based interface of the AMF and Nsmf for the service based interface of the SMF etc. The Network Exposure Function (NEF) and the Network Repository Function (NRF) in FIG. 12 are not shown in FIG. 11 discussed above. However, it should be clarified that all NFs depicted in FIG. 11 can interact with the NEF and the NRF of FIG. 12 as necessary, though not explicitly indicated in FIG. 11.

Some properties of the NFs shown in FIGS. 11 and 12 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 13:
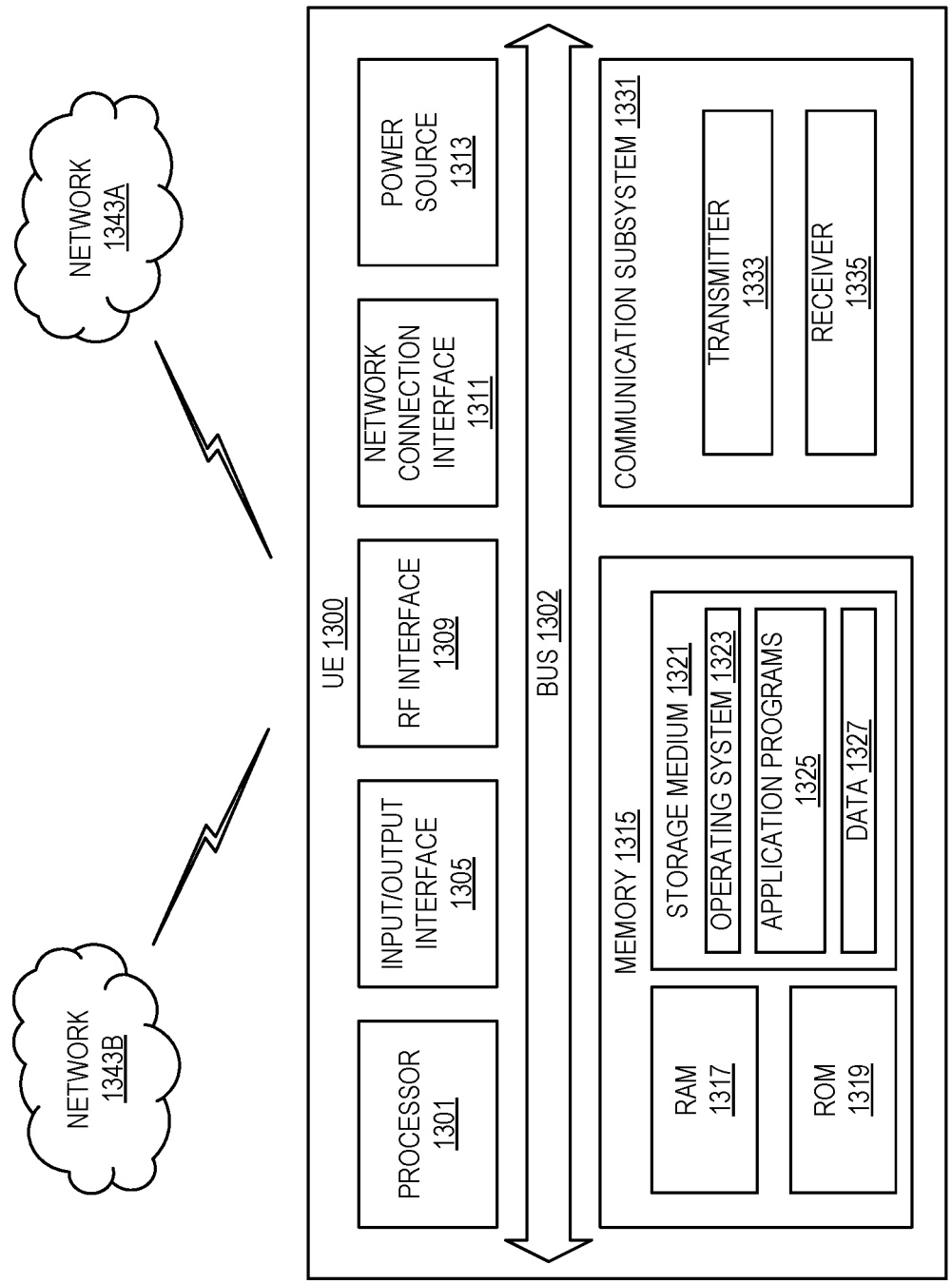
FIG. 13 illustrates one embodiment of a UE in accordance with various aspects described herein.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). A UE 1300 may be any UE identified by 3GPP, including a NB-IoT UE, a MTC UE, and/or an enhanced MTC (eMTC) UE. The UE 1300, as illustrated in FIG. 13, is one example of a WD configured for communication in accordance with one or more communication standards promulgated by 3GPP, such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, the UE 1300 includes processing circuitry 1301 that is operatively coupled to an input/output interface 1305, an RF interface 1309, a network connection interface 1311, memory 1315 including RAM 1317, ROM 1319, and a storage medium 1321 or the like, a communication subsystem 1331, a power source 1313, and/or any other component, or any combination thereof. The storage medium 1321 includes an operating system 1323, an application program 1325, and data 1327. In some embodiments, the storage medium 1321 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, the processing circuitry 1301 may be configured to process computer instructions and data. The processing circuitry 1301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored programs, general purpose processors, such as a microprocessor or DSP, together with appropriate software; or any combination of the above. For example, the processing circuitry 1301 may include two CPUs. Data may be information in a form suitable for use by a computer.

In the depicted embodiment, the input/output interface 1305 may be configured to provide a communication interface to an input device, output device, or input and output device. The UE 1300 may be configured to use an output device via the input/output interface 1305. An output device may use the same type of interface port as an input device. For example, a USB port may be used to provide input to and output from the UE 1300. The output device may be a speaker, a sound card, a video card, a display, a monitor, a printer, an actuator, an emitter, a smartcard, another output device, or any combination thereof. The UE 1300 may be configured to use an input device via the input/output interface 1305 to allow a user to capture information into the UE 1300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, the RF interface 1309 may be configured to provide a communication interface to RF components such as a transmitter, a receiver, and an antenna. The network connection interface 1311 may be configured to provide a communication interface to a network 1343A. The network 1343A may encompass wired and/or wireless networks such as a LAN, a WAN, a computer network, a wireless network, a telecommunications network, another like network or any combination thereof. For example, the network 1343A may comprise a WiFi network. The network connection interface 1311 may be configured to include a receiver and a transmitter interface used to communicate with one or more other devices over a communication network according to one or more communication protocols, such as Ethernet, Transmission Control Protocol (TCP)/IP, Synchronous Optical Networking (SONET), Asynchronous Transfer Mode (ATM), or the like. The network connection interface 1311 may implement receiver and transmitter functionality appropriate to the communication network links (e.g., optical, electrical, and the like). The transmitter and receiver functions may share circuit components, software, or firmware, or alternatively may be implemented separately.

The RAM 1317 may be configured to interface via a bus 1302 to the processing circuitry 1301 to provide storage or caching of data or computer instructions during the execution of software programs such as the operating system, application programs, and device drivers. The ROM 1319 may be configured to provide computer instructions or data to the processing circuitry 1301. For example, the ROM 1319 may be configured to store invariant low-level system code or data for basic system functions such as basic Input and Output (I/O), startup, or reception of keystrokes from a keyboard that are stored in a non-volatile memory. The Storage medium 1321 may be configured to include memory such as RAM, ROM, Programmable ROM (PROM), Erasable PROM (EPROM), Electrically EPROM (EEPROM), magnetic disks, optical disks, floppy disks, hard disks, removable cartridges, or flash drives. In one example, the storage medium 1321 may be configured to include the operating system 1323, the application program 1325 such as a web browser application, a widget or gadget engine, or another application, and the data file 1327. The storage medium 1321 may store, for use by the UE 1300, any of a variety of various operating systems or combinations of operating systems.

The storage medium 1321 may be configured to include a number of physical drive units, such as a Redundant Array of Independent Disks (RAID), a floppy disk drive, flash memory, a USB flash drive, an external hard disk drive, a thumb drive, a pen drive, a key drive, a High-Density Digital Versatile Disc (HD-DVD) optical disc drive, an internal hard disk drive, a Blu-Ray optical disc drive, a Holographic Digital Data Storage (HDDS) optical disc drive, an external mini-Dual In-Line Memory Module (DIMM), Synchronous Dynamic RAM (SDRAM), external micro-DIMM SDRAM, smartcard memory such as a Subscriber Identity Module (SIM) or a Removable User Identity (RUIM) module, other memory, or any combination thereof. The storage medium 1321 may allow the UE 1300 to access computer-executable instructions, application programs, or the like, stored on transitory or non-transitory memory media, to off-load data or to upload data. An article of manufacture, such as one utilizing a communication system, may be tangibly embodied in the storage medium 1321, which may comprise a device readable medium.

In FIG. 13, the processing circuitry 1301 may be configured to communicate with a network 1343B using the communication subsystem 1331. The network 1343A and the network 1343B may be the same network or networks or different network or networks. The communication subsystem 1331 may be configured to include one or more transceivers used to communicate with the network 1343B. For example, the communication subsystem 1331 may be configured to include one or more transceivers used to communicate with one or more remote transceivers of another device capable of wireless communication such as another WD, UE, or base station of a Radio Access Network (RAN) according to one or more communication protocols, such as IEEE 802.13, Code Division Multiple Access (CDMA), WCDMA, GSM, LTE, Universal Terrestrial RAN (UTRAN), WiMax, or the like. Each transceiver may include a transmitter 1333 and/or a receiver 1335 to implement transmitter or receiver functionality, respectively, appropriate to the RAN links (e.g., frequency allocations and the like). Further, the transmitter 1333 and the receiver 1335 of each transceiver may share circuit components, software, or firmware, or alternatively may be implemented separately.

In the illustrated embodiment, the communication functions of the communication subsystem 1331 may include data communication, voice communication, multimedia communication, short-range communications such as Bluetooth, near-field communication, location-based communication such as the use of the Global Positioning System (GPS) to determine a location, another like communication function, or any combination thereof. For example, the communication subsystem 1331 may include cellular communication, WiFi communication, Bluetooth communication, and GPS communication. The network 1343B may encompass wired and/or wireless networks such as a LAN, a WAN, a computer network, a wireless network, a telecommunications network, another like network, or any combination thereof. For example, the network 1343B may be a cellular network, a WiFi network, and/or a near-field network. A power source 1313 may be configured to provide Alternating Current (AC) or Direct Current (DC) power to components of the UE 1300.

The features, benefits, and/or functions described herein may be implemented in one of the components of the UE 1300 or partitioned across multiple components of the UE 1300. Further, the features, benefits, and/or functions described herein may be implemented in any combination of hardware, software, or firmware. In one example, the communication subsystem 1331 may be configured to include any of the components described herein. Further, the processing circuitry 1301 may be configured to communicate with any of such components over the bus 1302. In another example, any of such components may be represented by program instructions stored in memory that, when executed by the processing circuitry 1301, perform the corresponding functions described herein. In another example, the functionality of any of such components may be partitioned between the processing circuitry 1301 and the communication subsystem 1331. In another example, the non-computationally intensive functions of any of such components may be implemented in software or firmware and the computationally intensive functions may be implemented in hardware.

Figure 14:
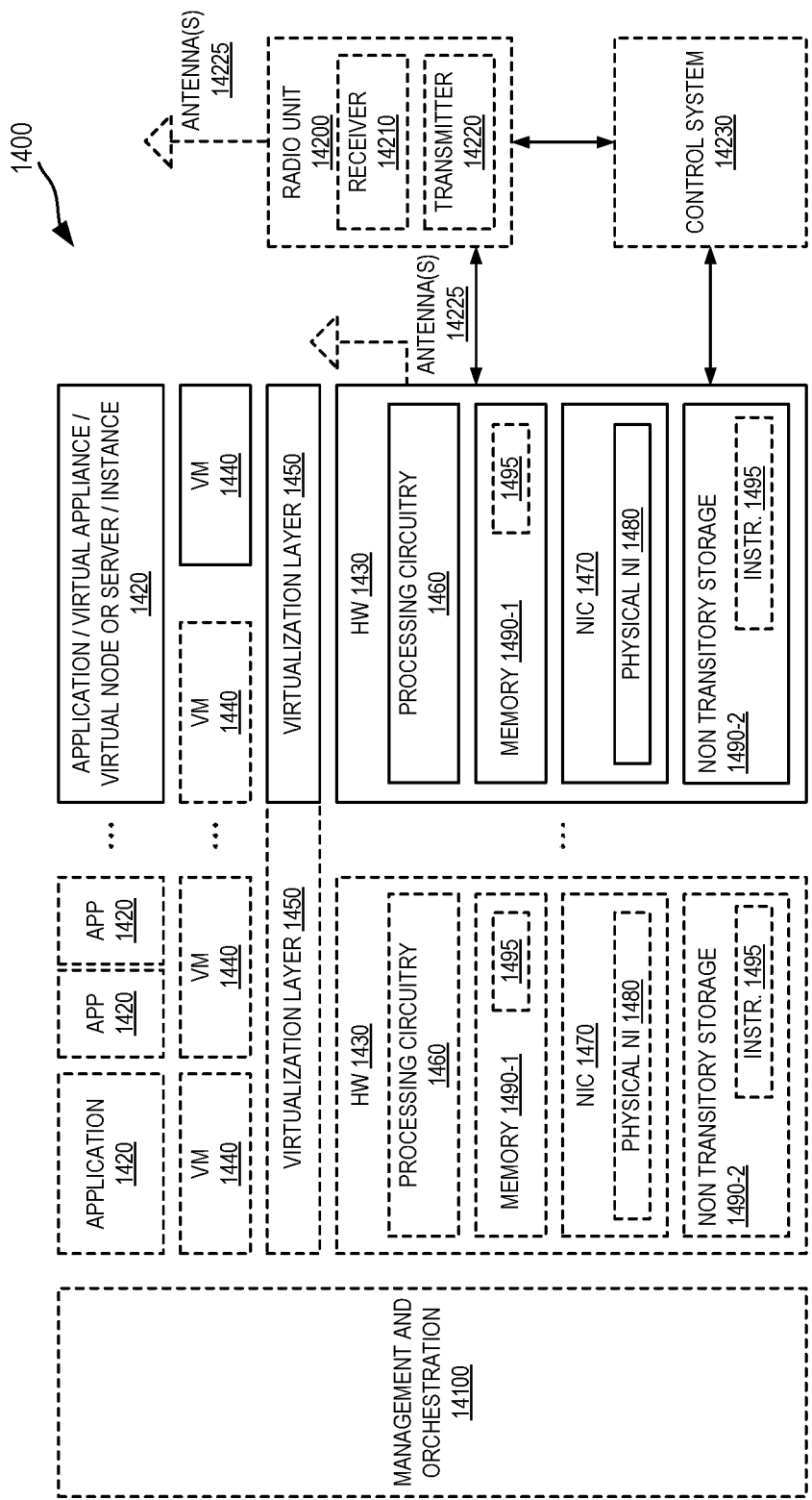
FIG. 14 is a schematic block diagram illustrating a virtualization environment 1400 in which functions implemented by some embodiments may be virtualized.

FIG. 14 is a schematic block diagram illustrating a virtualization environment 1400 in which functions implemented by some embodiments may be virtualized. In the present context, virtualizing means creating virtual versions of apparatuses or devices which may include virtualizing hardware platforms, storage devices, and networking resources. As used herein, virtualization can be applied to a node (e.g., a virtualized base station or a virtualized radio access node) or to a device (e.g., a UE, a WD, or any other type of communication device) or components thereof and relates to an implementation in which at least a portion of the functionality is implemented as one or more virtual components (e.g., via one or more applications, components, functions, virtual machines, or containers executing on one or more physical processing nodes in one or more networks).

In some embodiments, some or all of the functions described herein may be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node may be entirely virtualized.

The functions may be implemented by one or more applications 1420 (which may alternatively be called software instances, virtual appliances, network functions, virtual nodes, virtual network functions, etc.) operative to implement some of the features, functions, and/or benefits of some of the embodiments disclosed herein. The applications 1420 are run in the virtualization environment 1400 which provides hardware 1430 comprising processing circuitry 1460 and memory 1490. The memory 1490 contains instructions 1495 executable by the processing circuitry 1460 whereby the application 1420 is operative to provide one or more of the features, benefits, and/or functions disclosed herein.

The virtualization environment 1400 comprises general-purpose or special-purpose network hardware devices 1430 comprising a set of one or more processors or processing circuitry 1460, which may be Commercial Off-the-Shelf (COTS) processors, dedicated ASICs, or any other type of processing circuitry including digital or analog hardware components or special purpose processors. Each hardware device 1430 may comprise memory 1490-1 which may be non-persistent memory for temporarily storing instructions 1495 or software executed by the processing circuitry 1460. Each hardware device 1430 may comprise one or more Network Interface Controllers (NICs) 1470, also known as network interface cards, which include a physical network interface 1480. Each hardware device 1430 may also include non-transitory, persistent, machine-readable storage media 1490-2 having stored therein software 1495 and/or instructions executable by the processing circuitry 1460. The software 1495 may include any type of software including software for instantiating one or more virtualization layers 1450 (also referred to as hypervisors), software to execute virtual machines 1440, as well as software allowing it to execute functions, features, and/or benefits described in relation with some embodiments described herein.

The virtual machines 1440, comprise virtual processing, virtual memory, virtual networking or interface, and virtual storage, and may be run by a corresponding virtualization layer 1450 or hypervisor. Different embodiments of the instance of virtual appliance 1420 may be implemented on one or more of the virtual machines 1440, and the implementations may be made in different ways.

During operation, the processing circuitry 1460 executes the software 1495 to instantiate the hypervisor or virtualization layer 1450, which may sometimes be referred to as a Virtual Machine Monitor (VMM). The virtualization layer 1450 may present a virtual operating platform that appears like networking hardware to the virtual machine 1440.

As shown in FIG. 14, the hardware 1430 may be a standalone network node with generic or specific components. The hardware 1430 may comprise an antenna 14225 and may implement some functions via virtualization. Alternatively, the hardware 1430 may be part of a larger cluster of hardware (e.g., such as in a data center or CPE) where many hardware nodes work together and are managed via a Management and Orchestration (MANO) 14100, which, among others, oversees lifecycle management of the applications 1420.

Virtualization of the hardware is in some contexts referred to as Network Function Virtualization (NFV). NFV may be used to consolidate many network equipment types onto industry standard high volume server hardware, physical switches, and physical storage, which can be located in data centers and CPE.

In the context of NFV, the virtual machine 1440 may be a software implementation of a physical machine that runs programs as if they were executing on a physical, non-virtualized machine. Each of the virtual machines 1440, and that part of the hardware 1430 that executes that virtual machine 1440, be it hardware dedicated to that virtual machine 1440 and/or hardware shared by that virtual machine 1440 with others of the virtual machines 1440, forms a separate Virtual Network Element (VNE).

Still in the context of NFV, Virtual Network Function (VNF) is responsible for handling specific network functions that run in one or more virtual machines 1440 on top of the hardware networking infrastructure 1430 and corresponds to the application 1420 in FIG. 14.

In some embodiments, one or more radio units 14200 that each include one or more transmitters 14220 and one or more receivers 14210 may be coupled to the one or more antennas 14225. The radio units 14200 may communicate directly with the hardware nodes 1430 via one or more appropriate network interfaces and may be used in combination with the virtual components to provide a virtual node with radio capabilities, such as a radio access node or a base station.

In some embodiments, some signaling can be effected with the use of a control system 14230, which may alternatively be used for communication between the hardware nodes 1430 and the radio unit 14200.

Figure 15:
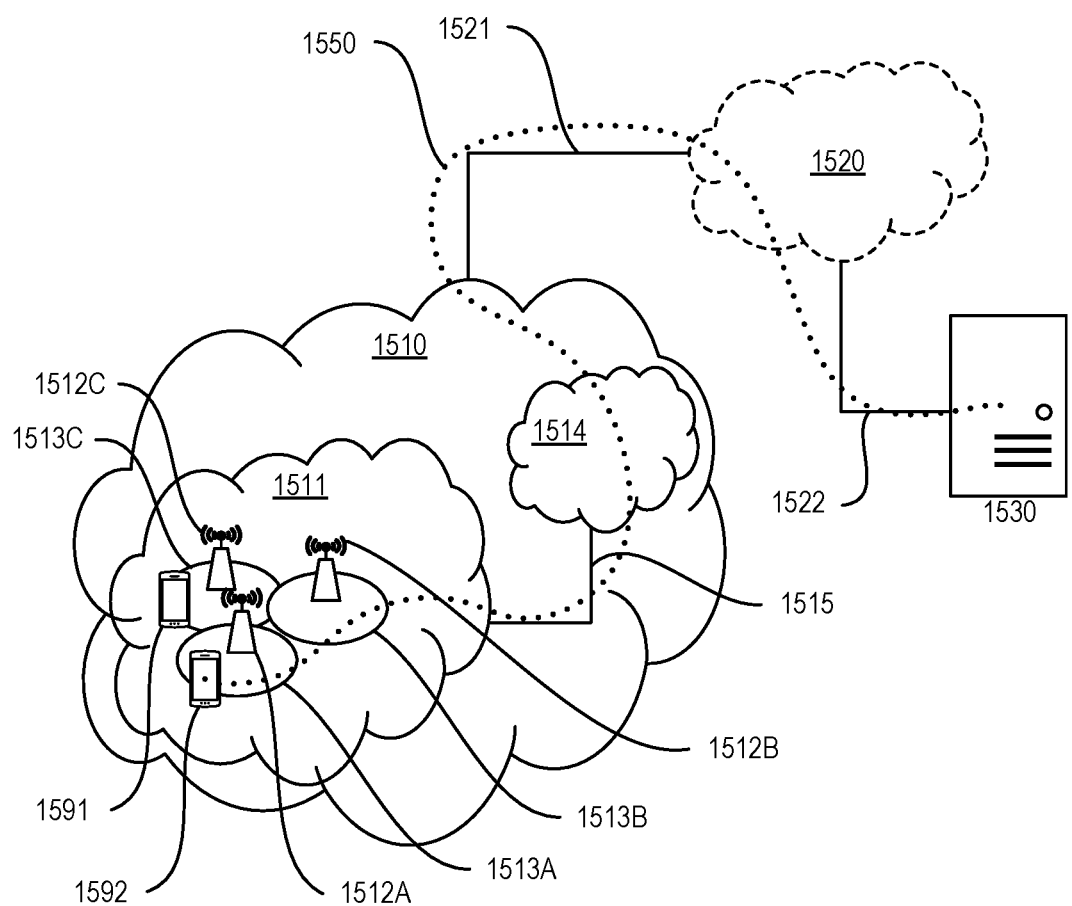
FIG. 15 illustrates a communication system according to some embodiments of the present disclosure.

FIG. 15 illustrates a communication system according to some embodiments of the present disclosure. With reference to FIG. 15, in accordance with an embodiment, a communication system includes a telecommunication network 1510, such as a 3GPP-type cellular network, which comprises an access network 1511, such as a RAN, and a core network 1514. The access network 1511 comprises a plurality of base stations 1512A, 1512B, 1512C, such as NBs, eNBs, gNBs, or other types of wireless APs, each defining a corresponding coverage area 1513A, 1513B, 1513C. Each base station 1512A, 1512B, 1512C is connectable to the core network 1514 over a wired or wireless connection 1515. A first UE 1591 located in coverage area 1513C is configured to wirelessly connect to, or be paged by, the corresponding base station 1512C. A second UE 1592 in coverage area 1513A is wirelessly connectable to the corresponding base station 1512A. While a plurality of UEs 1591, 1592 are illustrated in this example, the disclosed embodiments are equally applicable to a situation where a sole UE is in the coverage area or where a sole UE is connecting to the corresponding base station 1512.

The telecommunication network 1510 is itself connected to a host computer 1530, which may be embodied in the hardware and/or software of a standalone server, a cloud-implemented server, a distributed server, or as processing resources in a server farm. The host computer 1530 may be under the ownership or control of a service provider, or may be operated by the service provider or on behalf of the service provider. Connections 1521 and 1522 between telecommunication network 1510 and the host computer 1530 may extend directly from the core network 1514 to the host computer 1530 or may go via an optional intermediate network 1520. The intermediate network 1520 may be one of, or a combination of more than one of, a public, private, or hosted network; the intermediate network 1520, if any, may be a backbone network or the Internet; in particular, the intermediate network 1520 may comprise two or more sub-networks (not shown).

The communication system of FIG. 15 as a whole enables connectivity between the connected UEs 1591, 1592 and the host computer 1530. The connectivity may be described as an Over-the-Top (OTT) connection 1550. The host computer 1530 and the connected UEs 1591, 1592 are configured to communicate data and/or signaling via the OTT connection 1550, using the access network 1511, the core network 1514, any intermediate network 1520, and possible further infrastructure (not shown) as intermediaries. The OTT connection 1550 may be transparent in the sense that the participating communication devices through which the OTT connection 1550 passes are unaware of routing of uplink and downlink communications. For example, the base station 1512 may not or need not be informed about the past routing of an incoming downlink communication with data originating from the host computer 1530 to be forwarded (e.g., handed over) to a connected UE 1591. Similarly, the base station 1512 need not be aware of the future routing of an outgoing uplink communication originating from the UE 1591 towards the host computer 1530.

Figure 16:
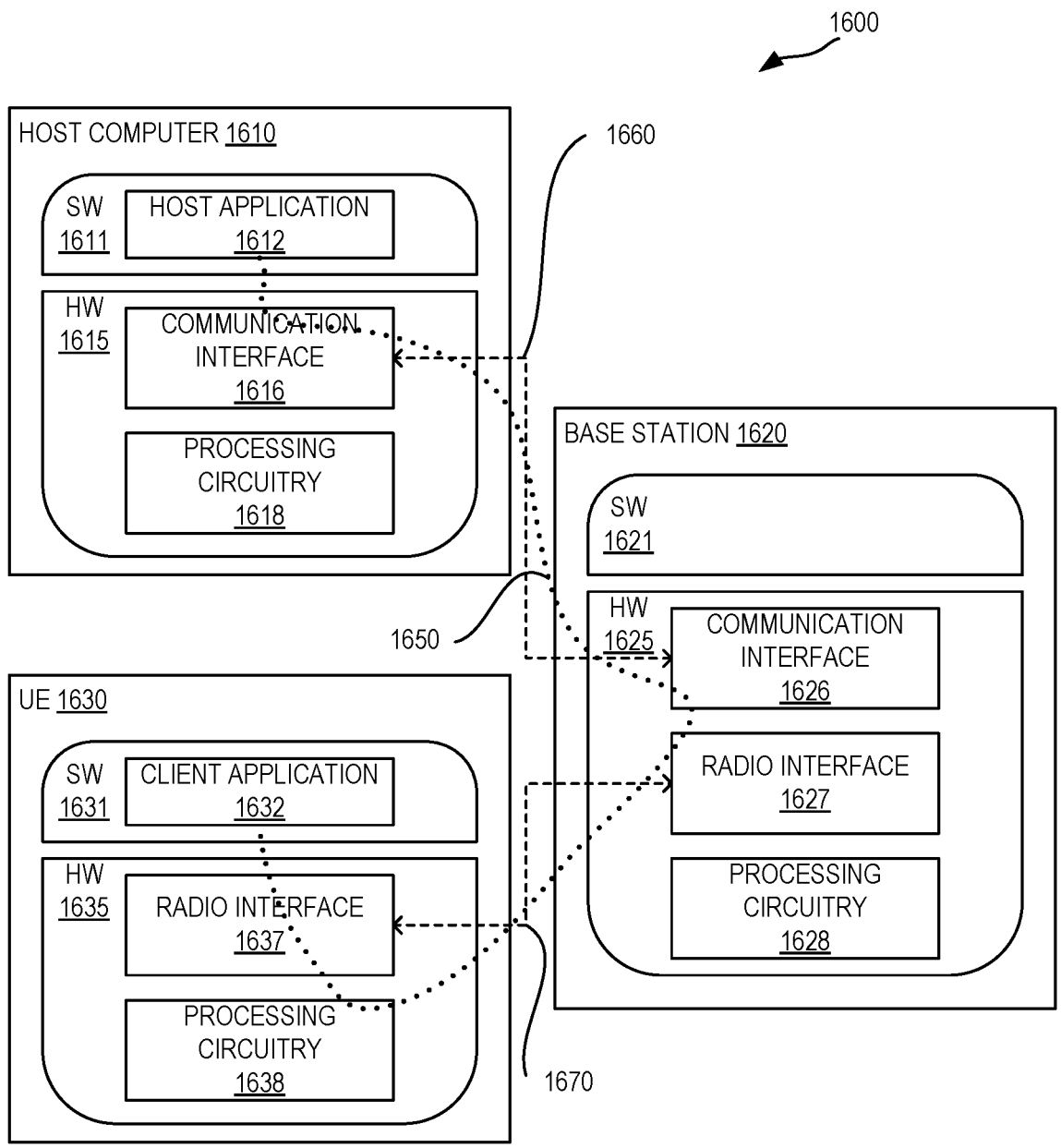
FIG. 16 illustrates a communication system according to some embodiments of the present disclosure.

FIG. 16 illustrates a communication system according to some embodiments of the present disclosure. Example implementations, in accordance with an embodiment, of the UE, base station, and host computer discussed in the preceding paragraphs will now be described with reference to FIG. 16. In a communication system 1600, a host computer 1610 comprises hardware 1615 including a communication interface 1616 configured to set up and maintain a wired or wireless connection with an interface of a different communication device of the communication system 1600. The host computer 1610 further comprises processing circuitry 1618, which may have storage and/or processing capabilities. In particular, the processing circuitry 1618 may comprise one or more programmable processors, ASICs, FPGAs, or combinations of these (not shown) adapted to execute instructions. The host computer 1610 further comprises software 1611, which is stored in or accessible by the host computer 1610 and executable by the processing circuitry 1618. The software 1611 includes a host application 1612. The host application 1612 may be operable to provide a service to a remote user, such as a UE 1630 connecting via an OTT connection 1650 terminating at the UE 1630 and the host computer 1610. In providing the service to the remote user, the host application 1612 may provide user data which is transmitted using the OTT connection 1650.

The communication system 1600 further includes a base station 1620 provided in a telecommunication system and comprising hardware 1625 enabling it to communicate with the host computer 1610 and with the UE 1630. The hardware 1625 may include a communication interface 1626 for setting up and maintaining a wired or wireless connection with an interface of a different communication device of the communication system 1600, as well as a radio interface 1627 for setting up and maintaining at least a wireless connection 1670 with the UE 1630 located in a coverage area (not shown in FIG. 16) served by the base station 1620. The communication interface 1626 may be configured to facilitate a connection 1660 to the host computer 1610. The connection 1660 may be direct or it may pass through a core network (not shown in FIG. 16) of the telecommunication system and/or through one or more intermediate networks outside the telecommunication system. In the embodiment shown, the hardware 1625 of the base station 1620 further includes processing circuitry 1628, which may comprise one or more programmable processors, ASICs, FPGAs, or combinations of these (not shown) adapted to execute instructions. The base station 1620 further has software 1621 stored internally or accessible via an external connection.

The communication system 1600 further includes the UE 1630 already referred to. The UE's 1630 hardware 1635 may include a radio interface 1637 configured to set up and maintain a wireless connection 1670 with a base station serving a coverage area in which the UE 1630 is currently located. The hardware 1635 of the UE 1630 further includes processing circuitry 1638, which may comprise one or more programmable processors, ASICs, FPGAs, or combinations of these (not shown) adapted to execute instructions. The UE 1630 further comprises software 1631, which is stored in or accessible by the UE 1630 and executable by the processing circuitry 1638. The software 1631 includes a client application 1632. The client application 1632 may be operable to provide a service to a human or non-human user via the UE 1630, with the support of the host computer 1610. In the host computer 1610, the executing host application 1612 may communicate with the executing client application 1632 via the OTT connection 1650 terminating at the UE 1630 and the host computer 1610. In providing the service to the user, the client application 1632 may receive request data from the host application 1612 and provide user data in response to the request data. The OTT connection 1650 may transfer both the request data and the user data. The client application 1632 may interact with the user to generate the user data that it provides.

It is noted that the host computer 1610, the base station 1620, and the UE 1630 illustrated in FIG. 16 may be similar or identical to the host computer 1530, one of the base stations 1512A, 1512B, 1512C, and one of the UEs 1591, 1592 of FIG. 15, respectively. This is to say, the inner workings of these entities may be as shown in FIG. 16 and independently, the surrounding network topology may be that of FIG. 15.

In FIG. 16, the OTT connection 1650 has been drawn abstractly to illustrate the communication between the host computer 1610 and the UE 1630 via the base station 1620 without explicit reference to any intermediary devices and the precise routing of messages via these devices. The network infrastructure may determine the routing, which may be configured to hide from the UE 1630 or from the service provider operating the host computer 1610, or both. While the OTT connection 1650 is active, the network infrastructure may further take decisions by which it dynamically changes the routing (e.g., on the basis of load balancing consideration or reconfiguration of the network).

The wireless connection 1670 between the UE 1630 and the base station 1620 is in accordance with the teachings of the embodiments described throughout this disclosure. One or more of the various embodiments improve the performance of OTT services provided to the UE 1630 using the OTT connection 1650, in which the wireless connection 1670 forms the last segment. More precisely, the teachings of these embodiments may improve the flexibility of PDSCH-to-HARQ-timing compared to conventional NR networks.

A measurement procedure may be provided for the purpose of monitoring data rate, latency, and other factors on which the one or more embodiments improve. There may further be an optional network functionality for reconfiguring the OTT connection 1650 between the host computer 1610 and the UE 1630, in response to variations in the measurement results. The measurement procedure and/or the network functionality for reconfiguring the OTT connection 1650 may be implemented in the software 1611 and the hardware 1615 of the host computer 1610 or in the software 1631 and the hardware 1635 of the UE 1630, or both. In some embodiments, sensors (not shown) may be deployed in or in association with communication devices through which the OTT connection 1650 passes; the sensors may participate in the measurement procedure by supplying values of the monitored quantities exemplified above, or supplying values of other physical quantities from which the software 1611, 1631 may compute or estimate the monitored quantities. The reconfiguring of the OTT connection 1650 may include message format, retransmission settings, preferred routing, etc.; the reconfiguring need not affect the base station 1620, and it may be unknown or imperceptible to the base station 1620. Such procedures and functionalities may be known and practiced in the art. In certain embodiments, measurements may involve proprietary UE signaling facilitating the host computer 1610's measurements of throughput, propagation times, latency, and the like. The measurements may be implemented in that the software 1611 and 1631 causes messages to be transmitted, in particular empty or 'dummy' messages, using the OTT connection 1650 while it monitors propagation times, errors, etc.

Figures 17, 18:
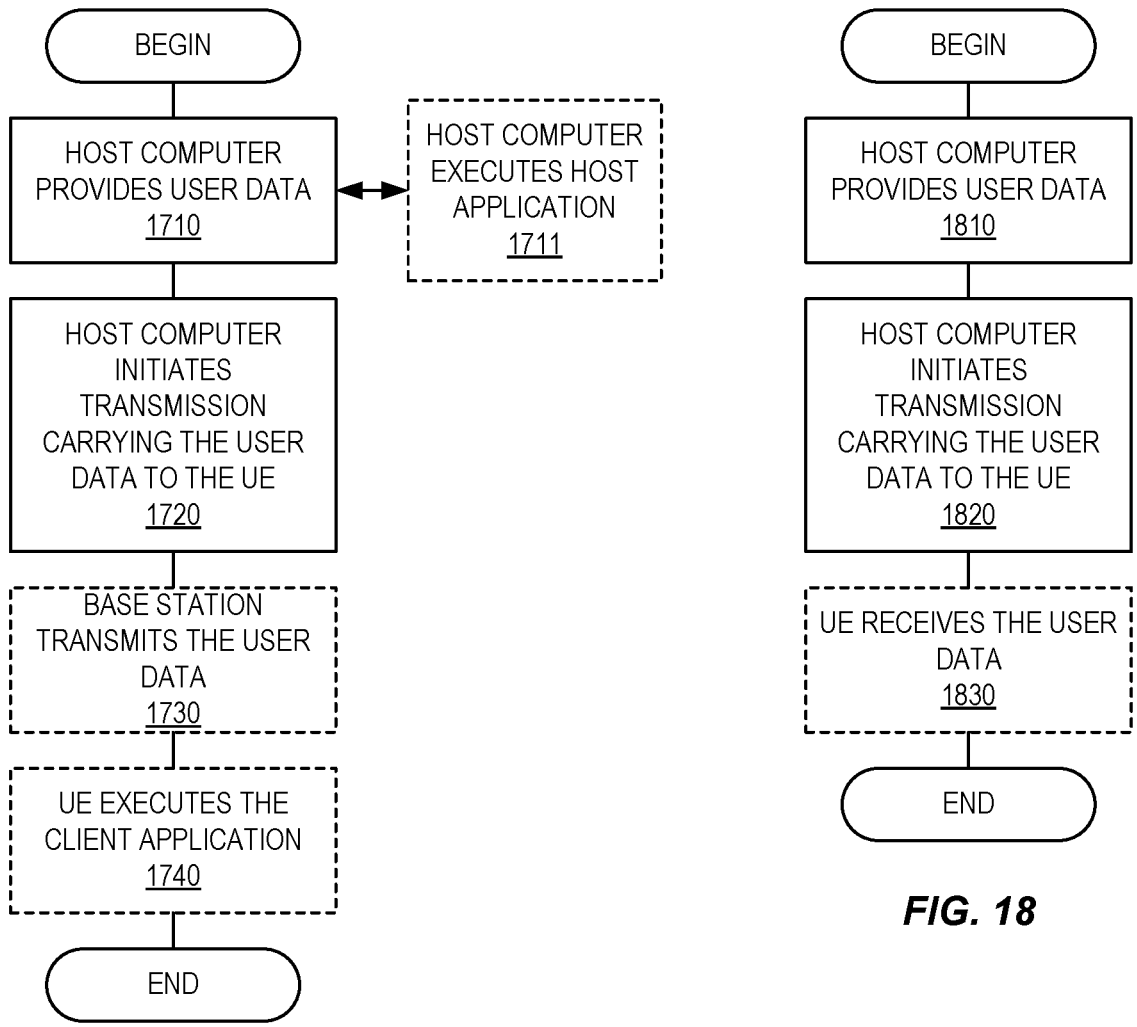
FIG. 17 is a flowchart illustrating a method implemented in a communication system, in accordance with some embodiments of the present disclosure.
FIG. 18 is a flowchart illustrating a method implemented in a communication system, in accordance with some embodiments of the present disclosure.

FIG. 17 is a flowchart illustrating a method implemented in a communication system, in accordance with some embodiments of the present disclosure. The communication system includes a host computer, a base station, and a UE which may be those described with reference to FIGS. 15 and 16. For simplicity of the present disclosure, only drawing references to FIG. 17 will be included in this section. In step 1710, the host computer provides user data. In sub-step 1711 (which may be optional) of step 1710, the host computer provides the user data by executing a host application. In step 1720, the host computer initiates a transmission carrying the user data to the UE. In step 1730 (which may be optional), the base station transmits to the UE the user data which was carried in the transmission that the host computer initiated, in accordance with the teachings of the embodiments described throughout this disclosure. In step 1740 (which may also be optional), the UE executes a client application associated with the host application executed by the host computer.

FIG. 18 is a flowchart illustrating a method implemented in a communication system, in accordance with some embodiments of the present disclosure. The communication system includes a host computer, a base station, and a UE which may be those described with reference to FIGS. 15 and 16. For simplicity of the present disclosure, only drawing references to FIG. 18 will be included in this section. In step 1810 of the method, the host computer provides user data. In an optional sub-step (not shown) the host computer provides the user data by executing a host application. In step 1820, the host computer initiates a transmission carrying the user data to the UE. The transmission may pass via the base station, in accordance with the teachings of the embodiments described throughout this disclosure. In step 1830 (which may be optional), the UE receives the user data carried in the transmission.

FIG. 19 is a flowchart illustrating a method implemented in a communication system, in accordance with some embodiments of the present disclosure. The communication system includes a host computer, a base station, and a UE which may be those described with reference to FIGS. 15 and 16. For simplicity of the present disclosure, only drawing references to FIG. 19 will be included in this section. In step 1910 (which may be optional), the UE receives input data provided by the host computer. Additionally or alternatively, in step 1920, the UE provides user data. In sub-step 1921 (which may be optional) of step 1920, the UE provides the user data by executing a client application. In sub-step 1911 (which may be optional) of step 1910, the UE executes a client application which provides the user data in reaction to the received input data provided by the host computer. In providing the user data, the executed client application may further consider user input received from the user. Regardless of the specific manner in which the user data was provided, the UE initiates, in sub-step 1930 (which may be optional), transmission of the user data to the host computer. In step 1940 of the method, the host computer receives the user data transmitted from the UE, in accordance with the teachings of the embodiments described throughout this disclosure.

FIG. 20 is a flowchart illustrating a method implemented in a communication system, in accordance with some embodiments of the present disclosure. The communication system includes a host computer, a base station, and a UE which may be those described with reference to FIGS. 15 and 16. For simplicity of the present disclosure, only drawing references to FIG. 20 will be included in this section. In step 2010 (which may be optional), in accordance with the teachings of the embodiments described throughout this disclosure, the base station receives user data from the UE. In step 2020 (which may be optional), the base station initiates transmission of the received user data to the host computer. In step 2030 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

EXAMPLE EMBODIMENTS

Group A Embodiments—Wireless Device Methods

1. A method, performed by a wireless device, for setting HARQ timing for PDSCH with a pending PDSCH-to-HARQ-timing-indicator, the method comprising: receiving first DCI associated with a first DL data transmission, the first DCI comprising a non-numerical PDSCH-to-HARQ-timing-indicator; receiving the first DL data transmission; determining a HARQ feedback for the first DL data transmission; receiving second DCI associated with a second DL data transmission, the second DCI comprising a numerical PDSCH-to-HARQ-timing-indicator indicating a location for HARQ feedback associated with the second DL data transmission; setting the location of HARQ feedback associated with the first DL data transmission to be the same as the location of HARQ feedback associated with the second DL data transmission; and transmitting the HARQ feedback associated with the first DL data transmission at the set location.

2. A method, performed by a wireless device, for setting HARQ timing for PDSCH with a pending PDSCH-to-HARQ-timing-indicator, the method comprising: receiving first DCI associated with a first DL data transmission of a first PDSCH group, the first DCI comprising a non-numerical PDSCH-to-HARQ-timing-indicator; receiving the first DL data transmission; determining a HARQ feedback for the first DL data transmission; receiving second DCI associated with a second DL data transmission, the second DCI comprising a numerical PDSCH-to-HARQ-timing-indicator indicating a location for HARQ feedback associated with the second DL data transmission; determining that the second DL data transmission is of the same PDSCH group as the first DL data transmission; setting the location of HARQ feedback associated with the first DL data transmission to be the same as the location of HARQ feedback associated with the second DL data transmission; and transmitting the HARQ feedback associated with the first DL data transmission at the set location.

3. A method, performed by a wireless device, for setting HARQ timing for PDSCH with a pending PDSCH-to-HARQ-timing-indicator, the method comprising: receiving a first DCI associated with a first DL data transmission of a first PDSCH group, the first DCI comprising a numerical PDSCH-to-HARQ-timing-indicator; determining that the location for the HARQ that is associated with the first DL data transmission, indicated by the numerical PDSCH-to-HARQ-timing-indicator, is too close to the first dl data transmission; and in response to that determination, not transmitting the HARQ that is associated with the first DL data transmission at the indicated HARQ transmission time.

4. The method of embodiment 3, further comprising providing an indication, on the PUCCH at the indicated HARQ transmission time, which informs the gNB that the HARQ feedback was postponed.

Group B Embodiments—gNB Methods

5. A method, performed by a gNB, for setting HARQ timing for PDSCH with a pending PDSCH-to-HARQ-timing-indicator, the method comprising: transmitting, to a first UE, a first DCI associated with a first DL data transmission, the first DCI comprising a non-numerical PDSCH-to-HARQ-timing-indicator; transmitting, to the first UE, a second DCI associated with a second DL data transmission, the second DCI comprising a numerical PDSCH-to-HARQ-timing-indicator and at least one of the following: at least one HARQ process ID; a NDI value; at least one PDSCH group ID; a corresponding DAI; and/or a trigger bit.

Group C Embodiments—Apparatus

6. A wireless device for setting HARQ timing for PDSCH with a pending PDSCH-to-HARQ-timing-indicator, the wireless device comprising: processing circuitry configured to perform any of the steps of any of the Group A embodiments; and power supply circuitry configured to supply power to the wireless device.

7. A base station for setting HARQ timing for PDSCH with a pending PDSCH-to-HARQ-timing-indicator, the base station comprising: processing circuitry configured to perform any of the steps of any of the Group B embodiments; power supply circuitry configured to supply power to the base station.

8. A User Equipment, UE, for setting HARQ timing for PDSCH with a pending PDSCH-to-HARQ-timing-indicator, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Group D Embodiments—System (with Host Computer)

9. A communication system including a host computer comprising: processing circuitry configured to provide user data; and a communication interface configured to forward the user data to a cellular network for transmission to a User Equipment, UE, wherein the cellular network comprises a base station having a radio interface and processing circuitry, the base station's processing circuitry configured to perform any of the steps of any of the Group B embodiments.

10. The communication system of the previous embodiment further including the base station.

11. The communication system of the previous 2 embodiments, further including the UE, wherein the UE is configured to communicate with the base station.

12. The communication system of the previous 3 embodiments, wherein: the processing circuitry of the host computer is configured to execute a host application, thereby providing the user data; and the UE comprises processing circuitry configured to execute a client application associated with the host application.

13. A method implemented in a communication system including a host computer, a base station and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

14. The method of the previous embodiment, further comprising, at the base station, transmitting the user data.

15. The method of the previous 2 embodiments, wherein the user data is provided at the host computer by executing a host application, the method further comprising, at the UE, executing a client application associated with the host application.

16. A User Equipment, UE, configured to communicate with a base station, the UE comprising a radio interface and processing circuitry configured to perform the method of the previous 3 embodiments.

17. A communication system including a host computer comprising: processing circuitry configured to provide user data; and a communication interface configured to forward user data to a cellular network for transmission to a User Equipment, UE, wherein the UE comprises a radio interface and processing circuitry, the UE's components configured to perform any of the steps of any of the Group A embodiments.

18. The communication system of the previous embodiment, wherein the cellular network further includes a base station configured to communicate with the UE.

19. The communication system of the previous 2 embodiments, wherein: the processing circuitry of the host computer is configured to execute a host application, thereby providing the user data; and the UE's processing circuitry is configured to execute a client application associated with the host application.

20. A method implemented in a communication system including a host computer, a base station and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

21. The method of the previous embodiment, further comprising at the UE, receiving the user data from the base station.

22. A communication system including a host computer comprising: communication interface configured to receive user data originating from a transmission from a User Equipment, UE, to a base station, wherein the UE comprises a radio interface and processing circuitry, the UE's processing circuitry configured to perform any of the steps of any of the Group A embodiments.

23. The communication system of the previous embodiment, further including the UE.

24. The communication system of the previous 2 embodiments, further including the base station, wherein the base station comprises a radio interface configured to communicate with the UE and a communication interface configured to forward to the host computer the user data carried by a transmission from the UE to the base station.

25. The communication system of the previous 3 embodiments, wherein: the processing circuitry of the host computer is configured to execute a host application; and the UE's processing circuitry is configured to execute a client application associated with the host application, thereby providing the user data.

26. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

27. A method implemented in a communication system including a host computer, a base station and a User Equipment, UE, the method comprising: at the host computer, receiving user data transmitted to the base station from the UE, wherein the UE performs any of the steps of any of the Group A embodiments.

28. The method of the previous embodiment, further comprising, at the UE, providing the user data to the base station.

29. The method of the previous 2 embodiments, further comprising: at the UE, executing a client application, thereby providing the user data to be transmitted; and at the host computer, executing a host application associated with the client application.

30. The method of the previous 3 embodiments, further comprising: at the UE, executing a client application; and at the UE, receiving input data to the client application, the input data being provided at the host computer by executing a host application associated with the client application, wherein the user data to be transmitted is provided by the client application in response to the input data.

31. A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

32. The communication system of the previous embodiment further including the base station.

33. The communication system of the previous 2 embodiments, further including the UE, wherein the UE is configured to communicate with the base station.

34. The communication system of the previous 3 embodiments, wherein: the processing circuitry of the host computer is configured to execute a host application; the UE is configured to execute a client application associated with the host application, thereby providing the user data to be received by the host computer.

35. A method implemented in a communication system including a host computer, a base station and a User Equipment, UE, the method comprising: at the host computer, receiving, from the base station, user data originating from a transmission which the base station has received from the UE, wherein the UE performs any of the steps of any of the Group A embodiments.

36. The method of the previous embodiment, further comprising at the base station, receiving the user data from the UE.

37. The method of the previous 2 embodiments, further comprising at the base station, initiating a transmission of the received user data to the host computer. According to some aspects of the present disclosure, a method, performed by a wireless device, for setting HARQ timing for PDSCH with a pending PDSCH-to-HARQ-timing-indicator, comprises: receiving a first DCI associated with a first DL data transmission, the first DCI comprising a non-numerical PDSCH-to-HARQ-timing-indicator; receiving the first DL data transmission; determining a HARQ feedback for the first DL data transmission; receiving a second DCI associated with a second DL data transmission, the second DCI comprising a numerical PDSCH-to-HARQ-timing-indicator indicating a location for HARQ feedback associated with the second DL data transmission; setting the location of HARQ feedback associated with the first DL data transmission to be the same as the location of HARQ feedback associated with the second DL data transmission; and transmitting the HARQ feedback associated with the first DL data transmission at the set location.

Abbreviations

At least some of the following abbreviations may be used in this disclosure. If there is an inconsistency between abbreviations, preference should be given to how it is used above. If listed multiple times below, the first listing should be preferred over any subsequent listing(s).

2G Second Generation
3G Third Generation
3GPP Third Generation Partnership Project
4G Fourth Generation
5G Fifth Generation
AC Alternating Current
ACK Acknowledge
AF Application Function
AMF Core Access and Mobility Management Function
AN Access Network
AP Access Point
ASIC Application Specific Integrated Circuit
ATM Asynchronous Transfer Mode
AUSF Authentication Server Function
BS Base Station
BSC Base Station Controller
BTS Base Transceiver Station
CA Carrier Aggregation
CBG Code Block Group
CD Compact Disk
CDMA Code Division Multiple Access
COT Channel Occupancy Time
COTS Commercial Off-The-Shelf
CPE Customer Premise Equipment
CPU Central Processing Unit
D2D Device-to-Device DAI Downlink Assignment Indicator
DAS Distributed Antenna System
DC Direct Current
DCI Downlink Control Information
DIMM Dual In-Line Memory Module
DL Downlink
DN Data Network
DSP Digital Signal Processor
DVD Digital Video Disk
EEPROM Electrically Erasable Programmable Read Only Memory
eMTC Enhanced Machine-Type Communication
eNB Evolved Node B
EPROM Erasable Programmable Read Only Memory
E-SMLC Evolved Serving Mobile Location Center
FPGA Field Programmable Gate Array
GHz Gigahertz
gNB New Radio Base Station
GPS Global Positioning System
GSM Global System for Mobile Communications
HARQ Hybrid Automatic Repeat Request
HDDS Holographic Digital Data Storage
HD-DVD High-Density Digital Versatile Disc
I/O Input and Output
IoT Internet of Things
IP Internet Protocol
kHz kilohertz
L1 Layer 1
LAN Local Area Network
LBT Listen Before Talk
LEE Laptop Embedded Equipment
LME Laptop Mounted Equipment
LTE Long Term Evolution
M2M Machine-to-Machine
MANO Management and Orchestration
MCE Multi-Cell/Multicast Coordination Entity
MDT Minimization of Drive Tests
MIMO Multiple Input Multiple Output
MME Mobility Management Entity
MSC Mobile Switching Center
MSR Multi-Standard Radio
MTC Machine-Type Communication
NACK Negative Acknowledge
NB-IoT Narrowband Internet of Things
NDI New Data Indicator
NEF Network Exposure Function
NFV Network Function Virtualization
NIC Network Interface Controller
NR New Radio
NRF Network Function Repository Function
NR-U New Radio in the Unlicensed spectrum
NSSF Network Slice Selection Function
O&M Operation and Maintenance
OFDM Orthogonal Frequency Division Multiplexing
OSS Operations Support System
OTT Over-the-Top
PCF Policy Control Function
PDA Personal Digital Assistant
PDCCH Physical Downlink Control Channel
PDSCH Physical Downlink Shared Channel
PROM Programmable Read Only Memory
PSTN Public Switched Telephone Networks
PUCCH Physical Uplink Control Channel
QoS Quality of Service
RAID Redundant Array of Independent Disks
RAM Random Access Memory
RAN Radio Access Network
RAT Radio Access Technology
RF Radio Frequency
RNC Radio Network Controller
ROM Read Only Memory
RRC Radio Resource Control
RRH Remote Radio Head
RRU Remote Radio Unit
RTT Round Trip Time
RUIM Removable User Identity
SDRAM Synchronous Dynamic Random Access Memory
SIM Subscriber Identity Module
SMF Session Management Function
SOC System on a Chip
SON Self-Organizing Network
SONET Synchronous Optical Networking
SPS Semi-Persistent Scheduling
TB Transport Block
TCP Transmission Control Protocol
TDD Time Division Duplexing
UCI Uplink Control Information
UDM Unified Data Management
UE User Equipment
UL Uplink
UMTS Universal Mobile Telecommunications System
USB Universal Serial Bus
UTRAN Universal Terrestrial Radio Access Network
V2I Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice over Internet Protocol
WAN Wide Area Network
WCDMA Wideband Code Division Multiple Access
WD Wireless Device
WiMax Worldwide Interoperability for Microwave Access
WLAN Wireless Local Area Network Those skilled in the art will recognize improvements and modifications to the embodiments of the present disclosure. All such improvements and modifications are considered within the scope of the concepts disclosed herein.

What is claimed is:

1. A method, performed by a wireless device, for setting Hybrid Automatic Repeat Request, HARQ, timing for Physical Downlink Shared Channel, PDSCH, with a pending PDSCH-to-HARQ-timing-indicator, the method comprising:
receiving a first Downlink Control Information, DCI, associated with a first Downlink, DL, data transmission, the first DCI comprising a predefined PDSCH-to-HARQ-timing-indicator, the predefined PDSCH-to-HARQ-timing indicator having a predefined value indicating that HARQ feedback for the first DL data transmission is to occur once the wireless device has received a DCI comprising a numerical PDSCH-to-HARQ-timing-indicator having a value different from the predefined value;
receiving the first DL data transmission;
determining a HARQ feedback for the first DL data transmission;
receiving a second DCI associated with a second DL data transmission, the second DCI comprising a numerical PDSCH-to-HARQ-timing-indicator indicating a location in time for HARQ feedback associated with the second DL data transmission;

setting a location in time of HARQ feedback associated with the first DL data transmission to be the same as the location in time of HARQ feedback associated with the second DL data transmission; and transmitting the HARQ feedback associated with the first DL data transmission at the set location in time.

2. The method of claim 1 wherein the predefined PDSCH-to-HARQ-timing-indicator is a non-applicable PDSCH-to-HARQ-timing-indicator.

3. The method of claim 2, wherein receiving the second DCI comprises receiving information indicating a number of how many HARQ processes should be reported, the number including all pending PDSCHs and all PDSCHs having a DCI comprising a non-applicable PDSCH-to-HARQ-timing-indicator since a last PDSCH have a DCI comprising a numerical PDSCH-to-HARQ-timing-indicator.

4. The method of claim 3, wherein receiving the information indicating a number of how many HARQ processes should be reported comprises receiving a Downlink Assignment Indicator, DAI.

5. The method of claim 2, further comprising, subsequent to receiving the second DCI associated with the second DL data transmission, determining that the second DL data transmission is of a same PDSCH group as the first DL data transmission, wherein setting the location in time of HARQ feedback associated with the first DL data transmission to be the same as the location in time of HARQ feedback associated with the second DL data transmission, and transmitting the HARQ feedback associated with the first DL data transmission at the set location in time are performed only upon determining that the second DL data transmission is of the same PDSCH group as the first DL data transmission.

6. The method of claim 2 wherein receiving the second DCI associated with the second DL data transmission comprises receiving a User Equipment, UE, -specific DCI transmitted on a Physical Downlink Control Channel, PDCCH, the UE-specific DCI comprising the PDSCH-to-HARQ-timing-indicator.

7. The method of claim 6 wherein the UE-specific DCI further comprises a HARQ process Identifier, ID.

8. The method of claim 7 wherein the UE-specific DCI further comprises a New Data Indicator, NDI, value corresponding to the HARQ process ID.

9. The method of claim 6 where the UE-specific DCI further comprises a PDSCH group ID and a corresponding Downlink Assignment Indicator, DAI.

10. The method of claim 6 wherein the UE-specific DCI further comprises a trigger bit indicating that the PDSCH-to-HARQ-timing-indicator is applicable to all PDSCHs with a pending or non-applicable PDSCH-to-HARQ-timing-indicator.

11. The method of claim 10 wherein the trigger bit comprises part of a DCI that is scheduling a PDSCH.

12. The method of claim 10 wherein the trigger bit comprises part of a DCI that is not scheduling a PDSCH.

13. The method of claim 1 wherein the predefined PDSCH-to-HARQ-timing-indicator is a numerical PDSCH-to-HARQ-timing-indicator having a predefined value indicating that the HARQ feedback for the first DL data transmission should be delayed until the wireless device has received a DCI comprising a numerical PDSCH-to-HARQ-timing-indicator having a value different from the predefined value.

14. The method of claim 13, wherein the predefined value comprises an existing PDSCH-to-HARQ-timing-indicator value that has been remapped from indicating a delay value to indicating that HARQ transmissions should be delayed until the wireless device has received a DCI comprising a numerical PDSCH-to-HARQ-timing-indicator having a value different from the predefined value.

15. The method of claim 14 wherein, prior to receiving the first DCI, the wireless device receives an instruction to remap the existing PDSCH-to-HARQ-timing-indicator value from indicating a delay value to indicating that HARQ transmissions should be delayed until the wireless device has received a DCI comprising a numerical PDSCH-to-HARQ-timing-indicator having a value different from the predefined value.

16. The method of claim 13, wherein the predefined value comprises an additional bit that has been added to an existing PDSCH-to-HARQ-timing-indicator value bit field in the DCI.

17. A method, performed by a base station, for setting Hybrid Automatic Repeat Request, HARQ, timing for Physical Downlink Shared Channel, PDSCH, with a pending PDSCH-to-HARQ-timing-indicator, the method comprising:

determining a PDSCH-to-HARQ-timing for an upcoming Downlink, DL, data transmission to a User Equipment, UE;

determining that the HARQ feedback for the upcoming DL data transmission should be delayed by the UE until further notification from the base station; and transmitting, to the UE, a first Downlink Control Information, DCI, associated with the upcoming DL data transmission, the first DCI comprising a predefined PDSCH-to-HARQ-timing-indicator value for indicating to the UE that HARQ feedback for the upcoming DL data transmission should be delayed until further notification from the base station.

18. The method of claim 17 wherein determining that the HARQ feedback for the upcoming DL data transmission should be delayed by the UE until further notification from the base station comprises determining that a processing delay from the end of the upcoming DL data transmission to the beginning of the HARQ feedback opportunity is less than a minimum threshold delay.

19. The method of claim 17 wherein the predefined PDSCH-to-HARQ-timing-indicator value comprises a non-applicable value.

20. The method of claim 17 wherein the predefined PDSCH-to-HARQ-timing-indicator value comprises an existing PDSCH-to-HARQ-timing-indicator value that has been remapped from indicating a delay value to indicating that HARQ transmissions should be delayed until a wireless device has received a DCI comprising a numerical PDSCH-to-HARQ-timing-indicator having a value different from the predefined value.

21. The method of claim 20 wherein, prior to sending the first DCI, the base station sends, to the UE, an instruction to remap the existing PDSCH-to-HARQ-timing-indicator value from indicating a delay value to indicating that HARQ transmissions should be delayed until the wireless device has received a DCI comprising a numerical PDSCH-to-HARQ-timing-indicator having a value different from the predefined value.

22. The method of claim 17, wherein the predefined PDSCH-to-HARQ-timing-indicator value comprises an additional bit that has been added to an existing PDSCH-to-HARQ-timing-indicator value bit field in the DCI.

23. The method of claim 17 further comprising transmitting the further notification to the UE.

24. The method of claim 23 wherein transmitting the further notification to the UE comprises transmitting a second DCI associated with a second DL data transmission, the second DCI comprising a numerical PDSCH-to-HARQ-timing-indicator.

25. The method of claim 24 wherein transmitting the second DCI further comprises transmitting at least one of the following: a HARQ process Identifier, ID; a New Data Indicator, NDI, value; a PDSCH group ID; a Downlink Assignment Indicator, DAI; or a trigger bit.

26. A wireless device for setting Hybrid Automatic Repeat Request, HARQ, timing for Physical Downlink Shared Channel, PDSCH, with a pending PDSCH-to-HARQ-timing-indicator, the wireless device comprising processing circuitry configured to:
    receive a first Downlink Control Information, DCI, (508) associated with a first Downlink, DL, data transmission, the first DCI comprising a predefined PDSCH-to-HARQ-timing-indicator for indicating to the wireless device that HARQ feedback for the first DL data transmission should be delayed;
    receive the first DL data transmission;
    determine a HARQ feedback for the first DL data transmission;
    receive a second DCI associated with a second DL data transmission, the second DCI comprising a numerical PDSCH-to-HARQ-timing-indicator indicating a location in time for HARQ feedback associated with the second DL data transmission;
    set a location in time of HARQ feedback associated with the first DL data transmission to be the same as the location in time of HARQ feedback associated with the second DL data transmission; and
    transmit the HARQ feedback associated with the first DL data transmission at the set location in time.

27. The wireless device of claim 26 wherein the processing circuitry comprises one or more processors and memory storing instructions executable by the one or more processors whereby the wireless device is operable to perform the steps.

28. A base station for setting Hybrid Automatic Repeat Request, HARQ, timing for Physical Downlink Shared Channel, PDSCH, with a pending PDSCH-to-HARQ-timing-indicator, the base station comprising processing circuitry configured to:
    determine a PDSCH-to-HARQ-timing for an upcoming Downlink, DL, data transmission to a User Equipment, UE;
    determine that the HARQ feedback for the upcoming DL data transmission should be delayed by the UE until further notification from the base station; and
    transmit, to the UE, a first Downlink Control Information, DCI, associated with a first DL data transmission, the first DCI comprising a predefined PDSCH-to-HARQ-timing-indicator value for indicating to the UE that HARQ feedback for the first DL data transmission should be delayed until further notification from the base station.

29. The base station of claim 28 wherein the processing circuitry comprises one or more processors and memory storing instructions executable by the one or more processors whereby the wireless device is operable to perform the steps.

* * * * *